US012628184B2

(12) United States Patent
Peng

(10) Patent No.: US 12,628,184 B2
(45) Date of Patent: May 12, 2026

(54) SIDELINK CARRIER MANAGEMENT METHOD AND APPARATUS, AND SYSTEM

(71) Applicant: HUAWEI TECHNOLOGIES CO., LTD., Shenzhen (CN)

(72) Inventor: Wenjie Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 278 days.

(21) Appl. No.: 18/325,540

(22) Filed: May 30, 2023

(65) Prior Publication Data

US 2023/0309118 A1     Sep. 28, 2023

Related U.S. Application Data

(63) Continuation of application No. PCT/CN2020/132887, filed on Nov. 30, 2020.

(51) Int. Cl.
*H04W 72/25*      (2023.01)
*H04L 5/00*       (2006.01)
*H04W 72/0453*    (2023.01)

(52) U.S. Cl.
CPC ........... *H04W 72/25* (2023.01); *H04L 5/0053* (2013.01); *H04W 72/0453* (2013.01)

(58) Field of Classification Search
CPC . H04W 72/25; H04W 72/0453; H04W 76/15; H04W 76/14; H04W 72/40;
(Continued)

(56) References Cited

U.S. PATENT DOCUMENTS 12,156,178 B2 *   11/2024   Lee ...................... H04W 72/20
2011/0207495 A1    8/2011   Gerstenberger et al.
(Continued)

FOREIGN PATENT DOCUMENTS

CN       105589506 A      5/2016
CN       109151844 A      1/2019
(Continued)

OTHER PUBLICATIONS

International Search Report issued in corresponding International Application No. PCT/CN2020/132887, mailed Aug. 6, 2021, pp. 1-10.
(Continued)

*Primary Examiner* — Brian T O Connor
(74) *Attorney, Agent, or Firm* — HAUPTMAN HAM, LLP

(57)         ABSTRACT

This application provides a sidelink carrier management method and apparatus, and a system. The method includes: A first communication apparatus obtains configuration information of a plurality of sidelink (SL) carriers. The first communication apparatus determines at least one SL carrier from the plurality of SL carriers. The first communication apparatus sends a first message to a second communication apparatus, where the first message includes information about the at least one SL carrier. According to the sidelink carrier management method provided in this application, a transmitting end communication apparatus determines at least one SL carrier for a unicast connection, and indicates the at least one SL carrier to a receiving end communication apparatus, to implement instant and effective management of the SL carrier. This improves SL carrier communication efficiency and a system capacity.

16 Claims, 8 Drawing Sheets

(58) Field of Classification Search
CPC ..... H04W 92/18; H04W 72/02; H04W 72/20;
H04W 72/23; H04W 4/40; H04W 72/535;
H04L 5/0053; H04L 1/1825; H04L
1/1861; H04L 1/1864; H04L 1/1893;
H04L 1/1896; H04L 5/0055; H04L 5/001
See application file for complete search history.

(56) References Cited

U.S. PATENT DOCUMENTS

| | | | |
|---|---|---|---|
| 2020/0351833 A1 | 11/2020 | Chae et al. | |
| 2022/0174647 A1* | 6/2022 | Lee ........................ | H04W 72/20 |
| 2022/0210739 A1* | 6/2022 | Yi ......................... | H04L 5/0037 |

FOREIGN PATENT DOCUMENTS

| | | |
|---|---|---|
| CN | 111447678 A | 7/2020 |
| CN | 111757291 A | 10/2020 |
| WO | 2020033089 A1 | 2/2020 |

OTHER PUBLICATIONS

Extended European Search Report issued in corresponding European Application No. 20963076.3, dated Nov. 16, 2023, pp. 1-9.

\* cited by examiner

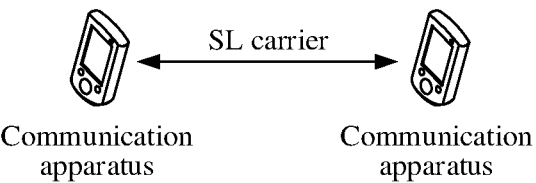

Communication          Communication
apparatus              apparatus

FIG. 1

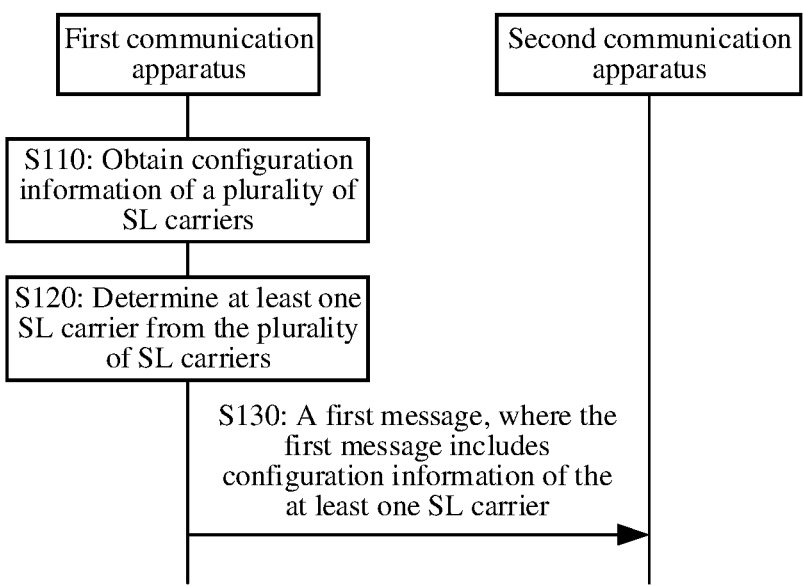

First communication apparatus

Second communication apparatus

S110: Obtain configuration information of a plurality of SL carriers

S120: Determine at least one SL carrier from the plurality of SL carriers

S130: A first message, where the first message includes configuration information of the at least one SL carrier

FIG. 2

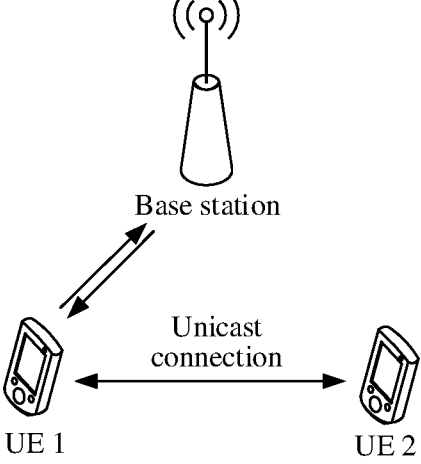

Base station

Unicast connection

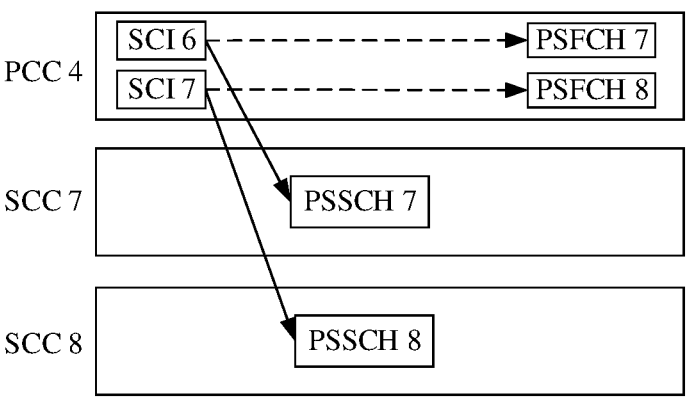

FIG. 12

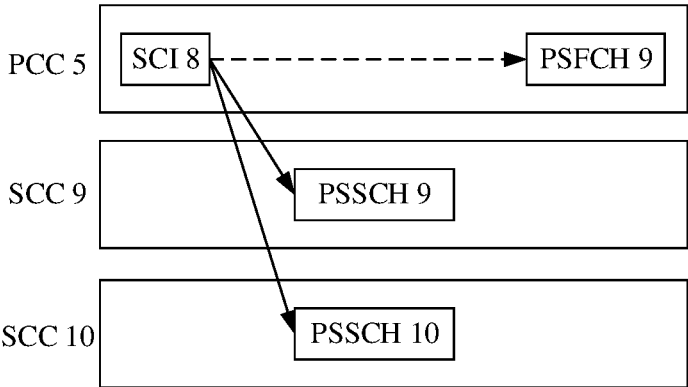

| | |
|---|---|
| Obtain a first switch time and a second switch time, where the first switch time and the second switch time are respectively switch times of a first communication apparatus and a second communication apparatus between a first frequency band and a second frequency band | ∿ S610 |
| Determine that a time interval is not less than a larger value of the first switch time and the second switch time, where the time interval is a time interval between an end time point of a first resource and a start time point of a second resource, the first resource belongs to the first frequency band, the second resource belongs to the second frequency band, and a time sequence of the first resource is before a time sequence of the second resource | ∿ S620 |

SIDELINK CARRIER MANAGEMENT METHOD AND APPARATUS, AND SYSTEM

CROSS-REFERENCE TO RELATED APPLICATIONS

This application is a continuation of International Application No. PCT/CN2020/132887, filed on Nov. 30, 2020, the disclosure of which is hereby incorporated by reference in its entirety.

TECHNICAL FIELD

This application relates to the communication field, and more specifically, to a sidelink carrier management method and apparatus, and a system in the communication field.

BACKGROUND

In a wireless communication system, two communication apparatuses may perform data communication with each other by using a network, or may directly communicate with each other by using a sidelink (SL) carrier without using a network device. A typical application scenario of SL communication is vehicle-to-everything (V2X). In the V2X, each vehicle is a communication apparatus, and data may be directly transmitted between two vehicles by using an SL without using the network. This can effectively reduce a communication delay.

Currently, communication between communication apparatuses supports single SL carrier communication, that is, one communication apparatus can send data to another communication apparatus by using only one SL carrier. However, a rate supported by a single carrier has an upper limit, and transmission efficiency is low. Therefore, a multi-carrier communication solution is introduced in the communication field to improve a data transmission rate.

In a long term evolution (LTE) system, the V2X performs multi-carrier communication through SL carrier aggregation (CA). However, the LTE system supports only broadcast communication on the SL carrier. Therefore, an intra-carrier closed-loop design is used to be compatible with a communication apparatus of an earlier version. Therefore, SL multi-carrier communication in the LTE system does not support cross-carrier scheduling, that is, transmission on each carrier of the SL is performed independently. For example, user equipment (UE) 1 and UE 2 perform the multi-carrier communication by using an SL carrier (CC) 1 and an SL CC 2. A location of data on the SL CC 1 is indicated by sidelink control information (SCI) on the SL CC 1, and a location of data on the SL CC 2 is indicated by SCI on the SL CC 2. The UE needs to monitor a transmission channel on each carrier to know all possible locations of data.

However, a new radio (NR) system supports unicast communication on the SL carrier. If the intra-carrier closed-loop design is still used, transmission efficiency is low. In addition, because a base station cannot sense a communication status between communication apparatuses, the base station cannot accurately manage the SL carrier in real time, and this affects transmission efficiency between the communication apparatuses.

Therefore, for SL unicast communication, how to implement timely and effective SL carrier management and how to improve the transmission efficiency between the communication apparatuses are urgent problems to be resolved.

2

SUMMARY

This application provides a sidelink carrier management method and apparatus, and a system, to implement instant and effective management of an SL carrier, and this improves SL carrier communication efficiency and a system capacity.

According to a first aspect, a sidelink carrier management method is provided. The method is performed by a first communication apparatus, and the first communication apparatus may be, for example, transmitting end user equipment (UE) in a unicast connection. The method includes: The first communication apparatus obtains configuration information of a plurality of sidelink SL carriers. The first communication apparatus determines at least one SL carrier from the plurality of SL carriers. The first communication apparatus sends a first message to a second communication apparatus, where the first message includes information about the at least one SL carrier.

According to the foregoing technical solutions, the first communication apparatus first obtains an available SL resource, then determines the at least one SL carrier from the SL resource as a communication carrier, and then indicates the at least one SL carrier to the second communication apparatus. The second communication apparatus is a peer communication apparatus of the first communication apparatus in the unicast connection. Because the first communication apparatus may directly sense a link status of the unicast connection between the first communication apparatus and the second communication apparatus, it is more timely and effective if the first communication apparatus manages an SL carrier of the unicast connection, and this helps improve SL carrier communication efficiency and a system capacity.

Optionally, the configuration information of the plurality of SL carriers includes at least one of carrier frequency information, resource pool configuration information, a subcarrier spacing, bandwidth, and synchronization configuration information of the plurality of SL carriers.

Optionally, that the first communication apparatus obtains the configuration information of the plurality of SL carriers of a sidelink SL includes: The first communication apparatus obtains the configuration information of the plurality of SL carriers from a base station by using dedicated signaling, where the dedicated signaling includes radio resource control (RRC): or the first communication apparatus obtains the configuration information of the plurality of SL carriers by listening to system broadcast: or the first communication apparatus obtains the configuration information of the plurality of SL carriers by using preconfiguration information.

Optionally, that the first communication apparatus determines at least one SL carrier from the plurality of SL carriers includes: The first communication apparatus determines the at least one SL carrier based on indication information sent by the base station: or the first communication apparatus determines the at least one SL carrier according to a preset rule.

It should be understood that the first communication apparatus may be a communication apparatus in a connected state (for example, an RRC connected state), or may be a communication apparatus in a non-connected state (for example, an idle state, an inactive state, or a radio link failure state).

It should be understood that the first communication apparatus may have a plurality of unicast connections. In this case, the first communication apparatus may determine at least one SL carrier for each unicast connection. It should be further understood that the at least one SL carrier determined by the first communication apparatus for each unicast connection may be the same or may be different. For example, different preset rules may be determined for each unicast connection based on quality of service (QoS) of each unicast connection, and the first communication apparatus correspondingly determines the at least one SL carrier for each unicast connection according to the different preset rules. For another example, the at least one SL carrier may be determined for each unicast connection by using a same preset rule. The preset rule is specifically that, for example, RSRP is greater than or equal to a threshold. Then, a different threshold is determined for each unicast connection based on the QoS of each unicast connection, and the first communication apparatus correspondingly determines the at least one SL carrier for each unicast connection according to the preset rule and based on the different threshold.

With reference to the first aspect, in a first possible implementation of the first aspect, that the first communication apparatus determines at least one SL carrier from the plurality of SL carriers includes: The first communication apparatus determines one SL carrier from the plurality of SL carriers as a primary component carrier PCC.

It should be understood that, when the first communication apparatus obtains the SL resource through the base station, the base station may indicate information about the PCC to the first communication apparatus when sending the configuration information of the plurality of SL carriers to the first communication apparatus, or may first send the configuration information of the plurality of SL carriers, and then indicate the PCC to the first communication apparatus.

With reference to the first possible implementation of the first aspect, in a second possible implementation of the first aspect, that the first communication apparatus determines at least one SL carrier from the plurality of SL carriers further includes: The first communication apparatus determines at least one SL carrier from the plurality of SL carriers as a secondary component carrier SCC, where the PCC carries control information, and the control information is used to schedule a resource that is on the SCC and that is used to transmit data.

According to the foregoing technical solutions, the first communication apparatus determines the one PCC and the at least one SCC from the plurality of SL carriers, and the PCC carries the control information used to schedule the resource that is on the SCC and that is used to transmit data. Therefore, the first communication apparatus may send the control information on the PCC to indicate a time-frequency resource on which data on the SCC is located, to implement cross-carrier scheduling and improve transmission efficiency. In addition, the first communication apparatus may learn locations of all possible data by listening to only PDCCH on the PCC, so that power consumption of the communication apparatus can be effectively reduced.

With reference to any one of the first aspect, the first possible implementation of the first aspect, and the second possible implementation of the first aspect, in a third possible implementation of the first aspect, that the first communication apparatus determines at least one SL carrier from the plurality of SL carriers includes: The first communication apparatus receives a second message sent by the base station, where the second message includes the information about the at least one SL carrier. The first communication apparatus determines the at least one SL carrier based on the second message.

Optionally, before the first communication apparatus receives the second message sent by the base station, the first communication apparatus sends request information to the base station, where the request information is used to request SL resource information from the base station.

Optionally, the request information includes service information of the first communication apparatus, and the service information is used to indicate a service requirement of the first communication apparatus. For example, the service information includes a service unicast connection identifier (a destination layer 2 identifier), a required frequency range, a QoS requirement, a propagation type (unicast, broadcast, or multicast), and the like of the first communication apparatus.

With reference to any one of the first aspect, the first possible implementation of the first aspect, and the second possible implementation of the first aspect, in a fourth possible implementation of the first aspect, that the first communication apparatus determines at least one SL carrier from the plurality of SL carriers includes: The first communication apparatus determines, from the plurality of SL carriers, at least one SL carrier that meets a first preset rule.

With reference to the fourth possible implementation of the first aspect, in a fifth possible implementation of the first aspect, the first preset rule includes: a reference signal received power RSRP is greater than a first threshold; and/or a channel busy ratio CBR is less than a second threshold.

With reference to any one of the first aspect or the first to the fifth possible implementations of the first aspect, in a sixth possible implementation of the first aspect, after the first communication apparatus sends the first message to the second communication apparatus, the method further includes: The first communication apparatus obtains link measurement information of a first SL carrier, where the first SL carrier is any one of the at least one SL carrier. When the link measurement information of the first SL carrier meet a second preset rule, the first communication apparatus updates the first SL carrier.

According to the foregoing technical solutions, the first communication apparatus may update, in a timely manner by obtaining link measurement information of the at least one SL carrier, an SL carrier that does not meet the preset rule in the at least one SL carrier, so that the SL carrier is managed in a timely and effective manner and communication quality is improved.

Optionally, the second preset rule includes: reference signal received quality RSRQ is greater than a third threshold; and/or a channel busy ratio (CBR) is less than or equal to a fourth threshold. Alternatively, the second preset rule includes: RSRQ is greater than or equal to a third threshold, a CBR is less than or equal to a fourth threshold, and there is an SL carrier whose link measurement information meets a third preset rule. Optionally, the third preset rule includes: The RSRP is less than or equal to a fifth threshold and the CBR is greater than or equal to a sixth threshold.

That the first communication apparatus updates the first SL carrier refers to that the first communication apparatus updates an SL carrier that is in the at least one SL carrier and whose link measurement information meets the second preset rule. For example, after obtaining the link measurement information of the at least one SL carrier, the first communication apparatus updates the SL carrier that meets the second preset rule in the at least one SL carrier. The updating herein is: The first communication apparatus determines, from the obtained plurality of SL carriers, a new SL carrier to replace the SL carrier that meets the second preset rule, where the new SL carrier may be an SL carrier that meets the third preset rule.

Optionally, the first communication apparatus may obtain the second preset rule in a predefined manner, or may receive the second preset rule sent by the base station. When the first communication apparatus obtains the second preset rule through the base station and obtains the SL resource through the base station, the base station may send the second preset rule when sending the configuration information of the plurality of SL carriers to the first communication apparatus, or may send the second preset rule after sending the configuration information of the plurality of SL carriers.

According to the foregoing technical solutions, a transmitting end communication apparatus determines at least one SL carrier for a unicast connection, and indicates the at least one SL carrier to a receiving end communication apparatus, to implement instant and effective management of the SL carrier, and this improves SL carrier communication efficiency and a system capacity.

With reference to the sixth or seventh possible implementation of the first aspect, in an eighth possible implementation of the first aspect, that the first communication apparatus obtains link measurement information of a first SL carrier includes: The first communication apparatus monitors link information of the first SL carrier to obtain first measurement information; and/or the first communication apparatus receives second measurement information from the second communication apparatus, where the second measurement information is link measurement information obtained by the second communication apparatus by monitoring the link information of the first SL carrier.

With reference to any one of the first aspect, or the first to the seventh possible implementations of the first aspect, in a ninth possible implementation of the first aspect, the method further includes: The first communication apparatus sends a third message to the base station, where the third message includes the information about the at least one SL carrier.

According to the foregoing technical solutions, the first communication apparatus reports the determined at least one SL carrier to the base station, so that when scheduling an SL resource for the first communication apparatus, the base station can manage the SL resource more promptly and effectively, and this improves communication efficiency.

Optionally, the third message includes a unicast connection identifier, where the unicast connection identifier is used to identify the unicast connection between the first communication apparatus and the second communication apparatus.

It should be understood that when the first communication apparatus has a plurality of unicast connections, the third message includes a unicast connection identifier of each unicast connection, and an SL carrier corresponding to each unicast connection identifier.

According to a second aspect, a method for determining a HARQ feedback resource is provided. The method includes: A first communication apparatus sends first information to a second communication apparatus at a location of a first physical sidelink shared channel PSSCH resource, where the location of the first PSSCH resource is on a first SCC, and the first SCC is any SCC. The first communication apparatus receives hybrid automatic repeat request HARQ feedback information of the first information at a location of a first physical sidelink feedback channel PSFCH resource, where the location of the first PSFCH resource is determined based on the location of the first PSSCH resource, and the location of the first PSFCH resource is on the first SCC.

According to the foregoing technical solutions, locations of HARQ feedback resources for data transmission on different secondary carriers are specified, to avoid a case in which the communication apparatus cannot determine a location of a HARQ feedback resource during multi-carrier communication and affects transmission efficiency.

It should be understood that the foregoing technical solutions may be independently implemented in a corresponding multi-carrier scenario, or may be applied to an application scenario of the foregoing sidelink carrier management method.

According to a third aspect, a method for determining a HARQ feedback resource is provided. The method further includes: A first communication apparatus sends second information to a second communication apparatus at a location of a second PSSCH resource, where the location of the second PSSCH resource is on a second SCC, and the second SCC is any SCC. The first communication apparatus determines a location of a second PSFCH resource, where the location of the second PSFCH resource is on a PCC. The first communication apparatus receives HARQ feedback information of the second information at the location of the second PSFCH resource.

In the foregoing technical solutions, it is specified that locations of HARQ feedback resources of the PCC and the SCC are both on the PCC, to avoid a problem that transmission efficiency is affected because the communication apparatus cannot determine a location of a HARQ feedback resource during multi-carrier communication. In addition, locations of HARQ feedback resources on all carriers are on the PCC, and HARQ feedback results of all SL carriers may be learned by monitoring only the PSFCH on the PCC, and this helps reduce resource waste.

With reference to the third aspect, in a first possible implementation of the third aspect, information about at least one SL carrier includes an index of the second SCC and an identifier of a resource pool in which the second PSSCH is located.

With reference to the first possible implementation of the third aspect, in a second possible implementation of the third aspect, that the first communication apparatus determines a location of a second PSFCH resource includes: The first communication apparatus determines the location of the second PSFCH resource based on at least one of the location of the second PSSCH resource, the index of the second SCC, and the identifier of the resource pool in which the second PSSCH is located: or the first communication apparatus determines the location of the second PSFCH resource based on a location of a physical sidelink control channel PSCCH resource, where the PSCCH resource carries SCI indicating the location of the second PSSCH resource, and the location of the PSCCH resource is on the PCC.

With reference to the second possible implementation of the third aspect, in a third possible implementation of the third aspect, the PSCCH resource and the second PSFCH resource are in a same resource pool.

Optionally, both a first resource and a second resource may be PSSCH resources. Alternatively, a first resource is a PSSCH resource, and a second resource is a PSFCH resource.

It should be understood that when a transmitting end communication apparatus obtains an SL resource used for SL data transmission, the transmitting end communication apparatus needs to determine which piece of SL data is to be sent by using the SL resource. When the piece of SL data to be sent belongs to a unicast connection, a switch time capability limitation needs to be additionally considered. For example, after obtaining a first SL resource and a second SL resource, the first communication apparatus performs logical channel prioritization (LCP) processing to determine SL data that is to be preferentially sent. When the SL data that is to be preferentially sent is data of the unicast connection, it needs to be ensured that a switch time of the first communication apparatus and a switch time of the second communication apparatus are less than a time interval between the first SL resource and the second SL resource, where the second communication apparatus is a peer communication apparatus of the first communication apparatus in the unicast connection.

According to a fourth aspect, a communication method is provided. For example, the method may be executed by a base station or a transmitting end communication apparatus. The method includes: A first communication apparatus determines that a period of time for switching between a first frequency band and a second frequency band is a first switch time, where the first frequency band and the second frequency band are frequency bands of a PCC and a third SCC respectively, and the third SCC is any SCC. The first communication apparatus receives a fourth message sent by a second communication apparatus, where the fourth message includes a second switch time, and the second switch time is a period of time for the second communication apparatus to switch between the first frequency band and the second frequency band. The first communication apparatus determines that a time interval is not less than a larger value of the first switch time and the second switch time. The time interval is a time interval between an end time point of a first resource and a start time point of a second resource. The first resource belongs to the first frequency band, the second resource belongs to the second frequency band, and a time sequence of the first resource is before a time sequence of the second resource.

Optionally, when the base station performs the foregoing technical solutions, the obtaining the first switch time and the second switch time includes: The base station receives first information sent by the first communication apparatus, where the first information includes the first switch time and the second switch time.

Optionally, when a transmitting end communication apparatus of a unicast connection performs the foregoing technical solutions, the obtaining the first switch time and the second switch time includes: determining the first switch time; and receiving second information sent by the second communication apparatus, where the second information includes the second switch time.

According to the foregoing technical solutions, a switch time capability is introduced, so that a transmitting chain or a receiving chain of a communication apparatus can simultaneously support two frequency bands in a frequency band pair, to improve a communication capability and avoid a problem that a capability of the communication apparatus is limited.

With reference to the fourth aspect, in a first possible implementation of the fourth aspect, the first resource includes a resource used by a PSCCH, the second resource includes a resource used by a PSSCH, and SCI carried on the PSCCH indicates a location of the resource used by the PSSCH.

According to a fifth aspect, a sidelink carrier management method is provided. The method includes: A second communication apparatus receives a first message sent by a first communication apparatus. The first message includes configuration information of at least one sidelink SL carrier, and the at least one SL carrier is determined by the first communication apparatus from a plurality of SL carriers.

With reference to the fifth aspect, in a first possible implementation of the fifth aspect, when the first message includes configuration information of one SL carrier, the configuration information of the one SL carrier is configuration information of a primary component carrier PCC.

With reference to the fifth aspect, in a second possible implementation of the fifth aspect, when the first message includes configuration information of at least two SL carriers, the at least two SL carriers include a primary component carrier PCC, an SL carrier other than the PCC in the at least two SL carriers is a secondary component carrier SCC, the PCC carries control information, and the control information is used to schedule a resource that is on the SCC and that is used to transmit data.

With reference to any one of the fifth aspect, the first possible implementation of the fifth aspect, and the second possible implementation of the fifth aspect, in a third possible implementation of the fourth aspect, after the second user equipment UE receives the first message sent by the first communication apparatus, the method further includes: The second communication apparatus monitors link information of a first SL carrier to obtain second measurement information, where the first SL carrier is any one of the at least one SL carrier. The second communication apparatus sends the second measurement information to the first communication apparatus, where the second measurement information indicates the first communication apparatus to update the first SL carrier that does not meet a second preset rule.

With reference to the third possible implementation of the fifth aspect, in a fourth possible implementation of the fifth aspect, the second preset rule includes: reference signal received quality RSRQ is greater than a third threshold; and/or a received signal strength indicator RSSI is greater than a fourth threshold.

According to a sixth aspect, a method for determining a HARQ feedback resource is provided. The method includes: A second communication apparatus receives, at a location of a first physical sidelink shared channel PSSCH resource, first information sent by a first communication apparatus, where the location of the first PSSCH resource is on a first SCC, and the first SCC is any SCC. The second communication apparatus sends hybrid automatic repeat request HARQ feedback information of the first information at a location of a first PSFCH resource. The location of the first PSFCH resource is determined based on the location of the first PSSCH resource, and the location of the first PSFCH resource is on the first SCC.

With reference to the sixth aspect, in a first possible implementation of the sixth aspect, the method further includes: The second communication apparatus receives, at a location of a second physical sidelink shared channel PSSCH resource, second information sent by the first communication apparatus. The second PSSCH is on a second SCC, and the second SCC is any SCC. The second communication apparatus determines a location of a second PSFCH resource, where the location of the second PSFCH resource is on a PCC. The second communication apparatus sends HARQ feedback information of the second information at the location of the second PSFCH resource.

With reference to the first possible implementation of the sixth aspect, in a second possible implementation of the sixth aspect, information about at least one SL carrier includes an index of the second SCC and an identifier of a resource pool in which the second PSSCH is located.

With reference to the second possible implementation of the sixth aspect, in a third possible implementation of the sixth aspect, that the second communication apparatus determines a location of a second PSFCH resource includes: The second communication apparatus determines the location of the PSFCH resource based on at least one of the location of the second PSSCH resource, the index of the second SCC, and the identifier of the resource pool in which the second PSSCH is located: or the second communication apparatus determines the location of the second PSFCH resource based on a location of a physical sidelink control channel PSCCH resource, where the PSCCH resource carries SCI indicating the location of the second PSSCH resource, and the location of the PSCCH resource is on the PCC.

With reference to the third possible implementation of the sixth aspect, in a fourth possible implementation of the sixth aspect, the PSCCH resource and the second PSFCH resource are in a same resource pool.

According to a seventh aspect, a communication method is provided. The method includes: A second communication apparatus determines that a period of time for switching between a first frequency band and a second frequency band is a second switch time. The first frequency band and the second frequency band are frequency bands of a PCC and a third SCC respectively, and the third SCC is any SCC. The second communication apparatus sends a fourth message to a first communication apparatus, where the fourth message includes the second switch time. The second communication apparatus performs message transmission with the first communication apparatus on a first resource and a second resource. The first resource belongs to the first frequency band and the second resource belongs to the second frequency band. A time sequence of the first resource is before a time sequence of the second resource. A time interval between an end time point of the first resource and a start time point of the second resource is not less than a larger value of a first switch time and the second switch time, and the first switch time is a period of time for the first communication apparatus to switch between the first frequency band and the second frequency band.

With reference to the seventh aspect, in a first possible implementation of the seventh aspect, the first resource includes a resource used by a PSSCH, the second resource includes a resource used by a PSSCH, and SCI carried on a PSCCH indicates a location of the resource used by the PSSCH.

According to an eighth aspect, a sidelink carrier management method is provided. The method includes: A base station sends a second message to a first communication apparatus, where the second message includes configuration information of at least one sidelink SL carrier, and the second message indicates the first communication apparatus to determine at least one SL carrier for communication with a second communication apparatus.

With reference to the eighth aspect, in a first possible implementation of the eighth aspect, the information about the at least one SL carrier includes configuration information of a primary component carrier PCC.

With reference to the first possible implementation of the eighth aspect, in a second possible implementation of the seventh aspect, the information about the at least one SL carrier further includes configuration information of at least one secondary component carrier SCC, the PCC carries control information, and the control information is used to schedule a resource that is on the SCC and that is used to transmit data.

With reference to any one of the eighth aspect, the first possible implementation of the eighth aspect, and the second possible implementation of the eighth aspect, in a third possible implementation of the eighth aspect, the method further includes: The base station receives a third message sent by the first communication apparatus, where the third message includes the information about the at least one SL carrier.

According to a ninth aspect, a sidelink carrier management apparatus is provided. The apparatus includes a processing module and a transceiver module. The processing module is configured to obtain configuration information of a plurality of sidelink SL carriers. The processing module is further configured to determine at least one SL carrier from the plurality of SL carriers. The transceiver module is configured to send a first message to a second communication apparatus, where the first message includes information about the at least one SL carrier.

According to the foregoing apparatus, the communication apparatus determines the at least one SL carrier as a communication carrier, so that an SL carrier of a unicast connection can be managed in a timely and effective manner, to improve SL carrier communication efficiency and a system capacity.

According to a tenth aspect, an apparatus for determining a HARQ feedback resource is provided. The apparatus includes a transceiver module. The transceiver module is configured to: send first information to a second communication apparatus at a location of a first physical sidelink shared channel PSSCH resource, where the location of the first PSSCH resource is on a first SCC, and the first SCC is any SCC; and receive hybrid automatic repeat request HARQ feedback information of the first information at a location of a first physical sidelink feedback channel PSFCH resource, where the location of the first PSFCH resource is determined based on the location of the first PSSCH resource, and the location of the first PSFCH resource is on the first SCC.

According to the foregoing apparatus, locations of HARQ feedback resources for data transmission on different secondary carriers are specified, to avoid a case in which a communication apparatus cannot determine a location of a HARQ feedback resource during multi-carrier communication and affects transmission efficiency.

According to an eleventh aspect, a communication apparatus is provided. The apparatus includes a processing module and a transceiver module. The processing module is configured to: determine that a period of time for switching between a first frequency band and a second frequency band is a first switch time, where the first frequency band and the second frequency band are frequency bands of a PCC and a third SCC respectively, and the third SCC is any SCC: and determine that a time interval is not less than a larger value of the first switch time and a second switch time, where the time interval is a time interval between an end time point of a first resource and a start time point of a second resource, the first resource belongs to the first frequency band, the second resource belongs to the second frequency band, and a time sequence of the first resource is before a time sequence of the second resource. The transceiver module is configured to receive a fourth message sent by a second communication apparatus, where the fourth message includes the second switch time, and the second switch time is a period of time for the second communication apparatus to switch between the first frequency band and the second frequency band.

According to the foregoing communication apparatus, a switch time capability is introduced, so that a transmitting chain or a receiving chain of the communication apparatus can simultaneously support two frequency bands in a frequency band pair, to improve a communication capability and avoid a problem that a capability of the communication apparatus is limited.

According to a twelfth aspect, a sidelink carrier management apparatus is provided. The apparatus includes a sending module. The sending module is configured to receive a first message sent by a first communication apparatus, where the first message includes configuration information of at least one sidelink SL carrier, and the at least one SL carrier is determined by the first communication apparatus from a plurality of SL carriers.

According to the foregoing apparatus, a communication apparatus manages an SL carrier of a unicast connection in a more timely and effective manner, and this helps improve SL carrier communication efficiency and a system capacity.

According to a thirteenth aspect, an apparatus for determining a HARQ feedback resource is provided. The apparatus includes: a transceiver module. The transceiver module is configured to receive, at a location of a first physical sidelink shared channel PSSCH resource, first information sent by a first communication apparatus, where the location of the first PSSCH resource is on a first SCC, and the first SCC is any SCC. The transceiver module is further configured to send hybrid automatic repeat request HARQ feedback information of the first information at a location of a first PSFCH resource. The location of the first PSFCH resource is determined based on the location of the first PSSCH resource, and the location of the first PSFCH resource is on the first SCC.

According to the foregoing apparatus, locations of HARQ feedback resources for data transmission on different secondary carriers are specified, to avoid a case in which a communication apparatus cannot determine a location of a HARQ feedback resource during multi-carrier communication and affects transmission efficiency.

According to a fourteenth aspect, a communication apparatus is provided. The apparatus includes a processing module and a transceiver module. The processing module is configured to determine that a period of time for switching between a first frequency band and a second frequency band is a second switch time. The first frequency band and the second frequency band are frequency bands of a PCC and a third SCC respectively, and the third SCC is any SCC. The transceiver module is configured to: send a fourth message to a first communication apparatus, where the fourth message includes the second switch time; and perform message transmission with the first communication apparatus on a first resource and a second resource. The first resource belongs to the first frequency band and the second resource belongs to the second frequency band. A time sequence of the first resource is before a time sequence of the second resource. A time interval between an end time point of the first resource and a start time point of the second resource is not less than a larger value of a first switch time and the second switch time, and the first switch time is a period of time for the first communication apparatus to switch between the first frequency band and the second frequency band.

According to the foregoing communication apparatus, a switch time capability is introduced, so that a transmitting chain or a receiving chain of the communication apparatus can simultaneously support two frequency bands in a frequency band pair, to improve a communication capability and avoid a problem that a capability of the communication apparatus is limited.

According to a fifteenth aspect, a sidelink carrier management apparatus is provided. The apparatus includes a transceiver module. The transceiver module is configured to send a second message to a first communication apparatus, where the second message includes configuration information of at least one sidelink SL carrier, and the second message indicates the first communication apparatus to determine at least one SL carrier for communication with a second communication apparatus.

According to a sixteenth aspect, a communication apparatus is provided. The apparatus includes a processor, configured to execute a computer program stored in a memory, so that the communication apparatus performs any possible implementation of the first aspect to the seventh aspect.

According to a seventeenth aspect, a computer-readable storage medium is provided. The computer-readable storage medium stores a computer program. When the computer program runs on a computer, the computer is enabled to perform any possible implementation of the first aspect to the seventh aspect.

According to an eighteenth aspect, a chip system is provided. The chip system includes: a processor, configured to invoke a computer program from a memory and run a computer program, so that a communication device installed with the chip system performs any possible implementation of the first aspect to the seventh aspect.

According to a nineteenth aspect, a communication system is provided. The communication system includes at least a base station and a first communication apparatus. The first communication system is configured to obtain configuration information of a plurality of SL carriers of a sidelink SL. The base station is configured to send a second message to the first communication apparatus. The second message includes information about at least one SL carrier. The first communication apparatus is further configured to send a first message to a second communication apparatus. The first message includes the information about the at least one SL carrier. The communication system may further include the second communication apparatus.

With reference to the nineteenth aspect, in a first possible implementation of the nineteenth aspect, the base station is further configured to send the configuration information of the plurality of SL carriers of the sidelink SL to the first communication apparatus.

With reference to the nineteenth aspect or the first possible implementation of the nineteenth aspect, in a second possible implementation of the nineteenth aspect, the first communication apparatus is further configured to send a third message to the base station, where the third message includes the information about the at least one SL carrier.

BRIEF DESCRIPTION OF DRAWINGS

FIG. 1 is an example diagram of a system architecture according to at least one embodiment of this application;

FIG. 2 is a schematic diagram of interaction in an example of a sidelink carrier management method according to at least one embodiment of this application:

FIG. 3 is a schematic framework diagram of an example according to at least one embodiment of this application:

FIG. 12 is a schematic framework diagram of another example according to at least one embodiment of this application:

FIG. 13 is a schematic framework diagram of another example according to at least one embodiment of this application:

FIG. 14 is a schematic block diagram of an example of a communication method according to at least one embodiment of this application:

DESCRIPTION OF EMBODIMENTS

Figures 4, 5:
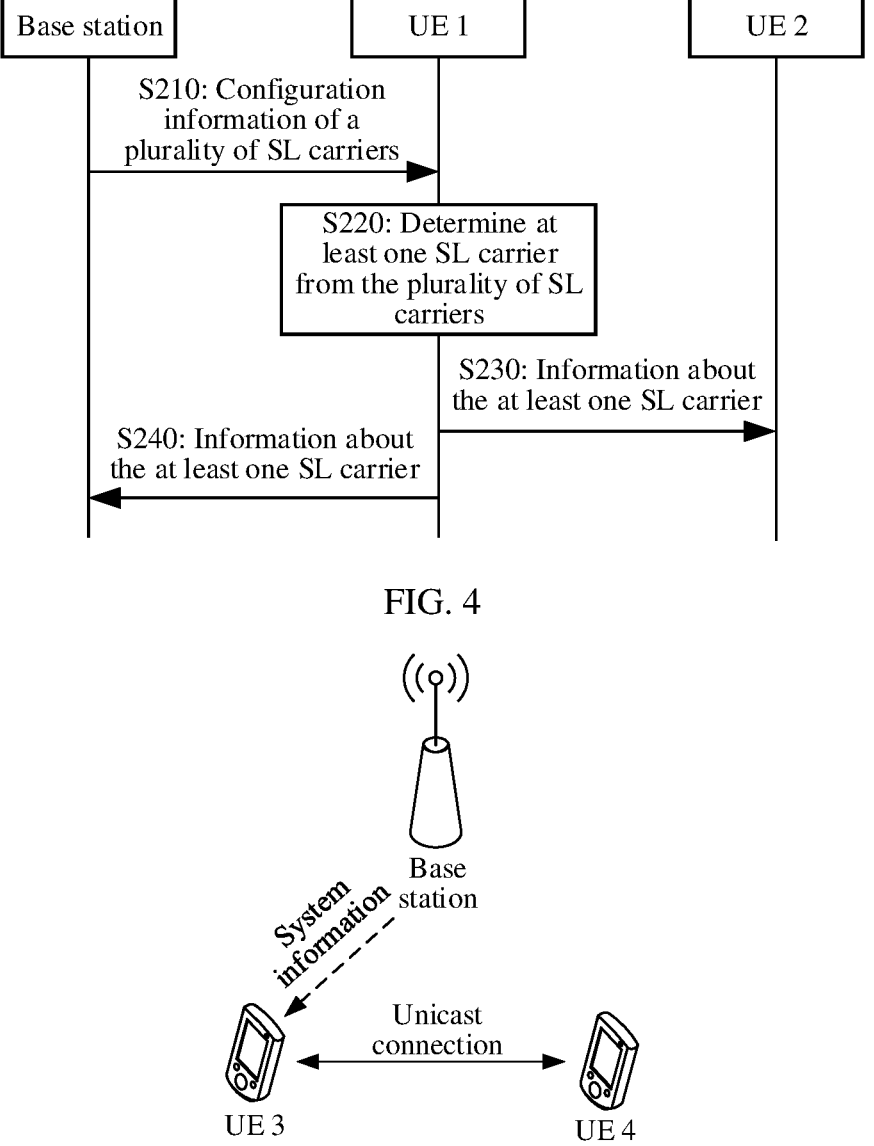
FIG. 4 is a schematic diagram of interaction in another example of a sidelink carrier management method according to at least one embodiment of this application.
FIG. 5 is a schematic framework diagram of another example according to at least one embodiment of this application.

The following describes the technical solutions in this application with reference to accompanying drawings in embodiments of this application.

The technical solutions in embodiments of this application may be applied to various communication systems, for example, a long term evolution (LTE) system, an LTE frequency division duplex (FDD) system, an LTE time division duplex (TDD) system, a worldwide interoperability for microwave access (WiMAX) communication system, a new radio (NR) system, another future evolved wireless communication system, or the like.

FIG. 1 is a schematic diagram of a communication architecture according to at least one embodiment of this application. As shown in FIG. 1, a communication system in this application includes at least two communication apparatuses, and the two communication apparatuses communicate with each other by using a sidelink SL carrier. The communication apparatus may be within network coverage and in a connected mode, an idle mode, or an inactive mode, or may be outside network coverage. It should be noted that the sidelink SL carrier is usually a carrier on a PC5 interface. The sidelink SL herein is a descriptive limitation on the carrier on the PC5 interface, and is intended to distinguish the carrier on the PC5 interface from a carrier on a Uu interface, but does not constitute any substantive limitation.

By way of example rather than limitation, the communication apparatus in at least one embodiment of this application may be a device having a wireless communication transceiver function or an apparatus or a chip system in the device having the wireless communication transceiver function. The communication apparatus in at least one embodiment of this application supports sidelink communication. The communication apparatus may be deployed on land, including an indoor device, an outdoor device, a roadside device, a handheld device, or a vehicle-mounted device: or may be deployed on water (for example, on a ship): or may be deployed in the air (for example, on a plane, a balloon, or a satellite). A terminal device may be a mobile phone (mobile phone), a tablet computer (pad), a computer having a wireless transceiver function, a virtual reality (VR) terminal, an augmented reality (AR) terminal, a wireless terminal in industrial control (industrial control), a wireless terminal in self-driving (self-driving), a wireless terminal in tele-medicine (remote medical), a wireless terminal in a smart grid (smart grid), a wireless terminal in transportation safety (transportation safety), a wireless terminal in a smart city (smart city), a wireless terminal in a smart home (smart home), user equipment (UE), a vehicle-mounted communication chip, a roadside unit, a communication apparatus in a roadside unit, or the like.

By way of example rather than limitation, a base station in at least one embodiment of this application may be a device that provides a wireless communication function service for the terminal device. The base station is usually located on a network side. For example, a specific implementation includes but is not limited to: a next generation NodeB (gNB) in a 5th generation (5G) communication system, an evolved NodeB (eNB) in an LTE system, a radio network controller (RNC), a NodeB (NB), a baseband unit (BBU), a transmission reception point (TRP), and a transmitting point (TP), a mobile switching center, an apparatus for providing a wireless communication service for a terminal device in a V2X communication system, a radio controller in a cloud radio access network (CRAN) scenario, a relay station, a vehicle-mounted device, a wearable device, a network device in a future evolved network, or the like. In a network structure, the base station may include a central unit (CU) node, a distributed unit (DU) node, a RAN device including a CU node and a DU node, or a RAN device including a control plane CU node (CU-CP node), a user plane CU node (CU-UP node), and a DU node.

The following first describes a sidelink carrier management method provided in embodiments of this application.

FIG. 2 is a schematic flowchart of a sidelink carrier management method 100 according to at least one embodiment of this application. As described in FIG. 2, the method 100 includes the following steps.

S110: A first communication apparatus obtains configuration information of a plurality of SL carriers.

S120: The first communication apparatus determines at least one SL carrier from the plurality of SL carriers.

S130: The first communication apparatus sends a first message to a second communication apparatus, where the first message includes information about the at least one SL carrier.

For example, the first communication apparatus first obtains information about available SL resources, namely, the configuration information of the plurality of SL carriers. Optionally, the first communication apparatus may obtain the configuration information of the plurality of SL carriers from a base station by using dedicated signaling, or obtain the configuration information of the plurality of SL carriers by listening to system broadcast. Optionally, the configuration information of the plurality of SL carriers includes at least one of carrier frequency information, resource pool configuration information, a subcarrier spacing, bandwidth, and synchronization configuration information of the plurality of SL carriers. Then, the first communication apparatus determines the at least one SL carrier from the plurality of SL carriers. Optionally, the first communication apparatus may determine the at least one SL carrier based on indication information sent by the base station, or determine the at least one SL carrier according to a preset rule. Then, the first communication apparatus notifies, by using the first message, a peer communication apparatus of a unicast connection, namely, the second communication apparatus, of the information about the at least one SL carrier. Therefore, in the sidelink carrier management method provided in this application, the first communication apparatus obtains the configuration information of the plurality of carriers, determines, from the plurality of carriers, at least one carrier for the unicast connection between the first communication apparatus and the second communication apparatus as a communication carrier, and indicates the determined at least one carrier to the second communication apparatus. To be specific, according to the SL carrier management method in at least one embodiment of this application, a transmitting end communication apparatus determines at least one SL carrier for a unicast connection, and indicates the at least one SL carrier to a receiving end communication apparatus, to implement instant and effective management of the SL carrier, and this improves SL carrier communication efficiency and a system capacity.

It should be noted that in at least one embodiment of this application, the first communication apparatus may be a communication apparatus in a connected state (for example, an RRC connected state), or may be a communication apparatus in a non-connected state (for example, an idle state, an inactive state, or a radio link failure state). This is not limited in this application. In addition, for ease of description, the following embodiments of this application are described by using an example in which UE is used as a communication apparatus.

It should be understood that the first communication apparatus may have a plurality of unicast connections, that is, there are a plurality of peer communication apparatuses. When there are the plurality of unicast connections, the first communication apparatus determines at least one SL carrier for a peer communication apparatus of each unicast connection. It should be further understood that the at least one SL carrier determined by the first communication apparatus for the peer communication apparatus of each unicast connection may be the same or may be different. This is not limited in this application.

FIG. 3 is a schematic framework diagram of an application scenario according to at least one embodiment of this application when UE is in a connected state. As shown in FIG. 3, UE 1 is a transmitting end communication apparatus, and UE 2 is a receiving end communication apparatus in a unicast connection to the UE 1. The UE 1 is in a connected state with a base station, and therefore may obtain SL resource information by using the base station. The UE 1 and the UE 2 communicate with each other in a unicast connection by using a sidelink SL carrier. It should be noted that the sidelink SL is only used to distinguish between the SL carrier and a carrier on a Uu interface, and does not constitute another limitation.

It should be understood that FIG. 3 is described only by using an example in which the UE 1 is the transmitting end communication apparatus and the UE 2 is the receiving end communication apparatus. However, at least one embodiment of this application is not limited thereto. For example, the UE 2 may alternatively be a transmitting end communication apparatus, and the UE 1 may alternatively be a receiving end communication apparatus.

It should be further understood that, the transmitting end communication apparatus UE 1 may have only one unicast connection, or may have a plurality of unicast connections. This is not limited in at least one embodiment of this application.

FIG. 4 is a schematic diagram of interaction of a sidelink carrier management method 200 according to at least one embodiment of this application. The method 200 may be applied to the application scenario shown in FIG. 3. It can be learned from FIG. 4 that the method 200 includes the following steps.

S210: UE 1 obtains configuration information of a plurality of SL carriers from a base station.

Optionally, before the UE 1 obtains the configuration information of the plurality of SL carriers of a sidelink SL from the base station, the UE 1 sends request information to the base station. The request information may be, for example, sidelink user equipment information (SidelinkUE-InformationNR), and the request information is used to request SL resource information from the base station.

Optionally, the request information includes service information of the UE 1, and the service information is used to indicate a service requirement of the UE 1. For example, the service information includes a unicast connection identifier (a destination layer 2 identifier), a frequency, a QoS requirement, a propagation type (unicast, broadcast, or multicast), and the like of the UE 1.

The base station determines the plurality of SL carriers based on the request information. Optionally, the plurality of SL carriers meet the service requirement of the UE 1.

Then, the base station sends the configuration information of the plurality of SL carriers to the UE 1. For example, the base station sends an RRC message to the UE 1, where the RRC message includes the configuration information of the plurality of SL carriers.

S220: The UE 1 determines at least one SL carrier from the plurality of SL carriers.

For example, the UE 1 determines one of the plurality of SL carriers as a primary component carrier (PCC).

Optionally, the UE 1 determines the PCC based on an indication of the base station.

For example, the base station determines one of the plurality of SL carriers as the PCC, and then sends a second message to the UE 1, where the second message includes information about the PCC. The UE 1 determines the PCC based on the second message.

It should be understood that the base station may indicate the PCC to the UE 1 when sending the configuration information of the plurality of SL carriers to the UE 1, or may first send the configuration information of the plurality of SL carriers, and then indicate the PCC to the UE 1. This is not limited in this application.

Optionally, the base station determines the PCC based on link information and/or the service requirement of the communication apparatus. For example, the base station selects an SL carrier with a best link status as the PCC: or the base station selects an SL carrier that best meets a service requirement of the UE 1 as the PCC: or the base station comprehensively determines an SL carrier as the PCC based on the link information and the service requirement of the UE 1. This embodiment of this application is not limited thereto.

Optionally, the UE 1 may further determine at least one SL carrier from the plurality of SL carriers as a secondary component carrier (SCC), that is, the at least one SL carrier determined by the UE 1 from the plurality of SL carriers includes one PCC and at least one SCC. When determining the at least one SCC, the UE 1 may schedule, in a cross-carrier manner, a resource that is for data transmission and that is on the SCC by using control information on the PCC, that is, the PCC may carry control information used to schedule the resource that is for data transmission and that is on the SCC. The control information may be, for example, sidelink control information (SCI).

Optionally, the UE 1 determines the at least one SCC based on an indication of the base station. The base station determines the at least one SL carrier from the plurality of SL carriers, where the at least one SL carrier includes the one PCC and the at least one SCC, and then sends the second message to the UE 1. The second message includes configuration information of the at least one SL carrier, that is, the second message includes configuration information of the PCC and the at least one SCC. The base station may indicate, by using the second message, an SL carrier used for communication between the UE 1 and UE 2. Correspondingly, the UE 1 receives the second message, and obtains the PCC and the at least one SCC from the second message as communication carriers.

It should be understood that the base station may indicate the PCC and the at least one SCC to the UE 1 when sending the configuration information of the plurality of SL carriers to the UE 1, or may first send the configuration information of the plurality of SL carriers, and then indicate the PCC and the at least one SCC to the UE 1. This is not limited in this application.

It should be understood that, when the UE 1 has at least two unicast connections, the base station may indicate at least one SL carrier for each unicast connection of the UE 1. The at least one SL carrier indicated by the base station for each unicast connection may be the same or may be different. When the base station indicates different SL carriers for each unicast connection of the UE 1, the at least one SL carrier indicated for the different unicast connection may be identified by using a unicast connection identifier. For example, the base station sends the second message to the UE 1, where the second message includes a unicast connection identifier of each unicast connection, and information about at least one SL carrier corresponding to each unicast connection identifier.

S230: The UE 1 sends the information about the at least one SL carrier to the UE 2.

For example, the UE 1 sends a first message to the UE 2, where the first message includes the information about the at least one SL carrier.

Optionally, after the UE 1 sends the information about the at least one SL carrier to the UE 2, the UE 1 obtains link measurement information of the at least one SL carrier.

Optionally, the UE 1 monitors link information of the at least one SL carrier to obtain first measurement information.

It should be understood that the UE 1 may monitor each SL carrier in the at least one SL carrier to obtain the link measurement information.

Optionally, the UE 1 receives second measurement information from the UE 2, where the second measurement information is link measurement information obtained by the UE 2 by monitoring the link information of the at least one SL carrier. It should be understood that the UE 1 may receive link measurement information that is of each SL carrier of the at least one SL carrier and that is measured by the UE 2, or may receive only link measurement information of an SL carrier whose link measurement information does not meet a link rule of the UE 2. This is not limited in this application.

The UE 1 updates an SL carrier that is in the at least one SL carrier and whose link measurement information meets a second preset rule. For example, the second preset rule may include: reference signal received quality (RSRQ) is greater than or equal to a third threshold; and/or a channel busy ratio (CBR) is less than or equal to a fourth threshold. For another example, the second preset rule includes: RSRQ is greater than or equal to a third threshold, a CBR is less than or equal to a fourth threshold, and there is an SL carrier whose link measurement information meets a third preset rule. The third preset rule may include, for example, RSRP is less than or equal to a fifth threshold and the CBR is greater than or equal to a sixth threshold. That the UE 1 updates the SL carrier that is in the at least one SL carrier and whose link measurement information meets the second preset rule refers to: after obtaining the link measurement information of the at least one SL carrier, the UE 1 updates the SL carrier that meets the second preset rule in the at least one SL carrier. The updating herein is: The UE 1 determines, from the plurality of SL carriers obtained in S210, a new SL carrier to replace the SL carrier that meets the second preset rule, where the new SL carrier may be an SL carrier that meets the third preset rule.

It should be understood that, the UE 1 may comprehensively consider the first measurement information obtained through monitoring by the UE 1 and the second measurement information sent by the UE 2. For example, the second preset rule is that RSRQ in the first measurement information is greater than the fifth threshold and RSRQ in the second measurement information is greater than the sixth threshold.

It should be understood that the UE 1 may obtain the second preset rule in a predefined manner, or may receive the second preset rule sent by the base station. When the UE 1 obtains the second preset rule by using the base station, the base station may send the second preset rule to the UE 1 in step S210, or may send the second preset rule after step S210. This is not limited in this application.

It should be further understood that in at least one embodiment of this application, only an example in which the RSRQ and the RSSI are used as link measurement information is used for description. However, at least one embodiment of this application is not limited thereto. For example, the UE 1 or the UE 2 may measure other link information or a combination of other link information based on a user requirement or a service requirement, for example, a channel busy ratio (CBR), a reference signal received power (RSRP), or channel state information (CSI).

S240: The UE 1 sends the information about the at least one SL carrier to the base station.

For example, the UE 1 sends a third message to the base station, where the third message includes the configuration information of the at least one SL carrier.

It should be understood that when the UE 1 updates the at least one SL carrier in S230, the at least one SL carrier is an updated SL carrier.

It should be noted that, when the UE 1 indicates the at least one SL carrier to the base station and the UE 1 indicates the at least one SL carrier to the UE 2, contents of sent messages may be different.

Optionally, the third message includes a unicast connection identifier, and the unicast connection identifier is used to identify a unicast connection between the UE 1 and the UE 2. It should be understood that, when the UE 1 has a plurality of unicast connections, the third message includes a unicast connection identifier of each unicast connection, and an SL carrier corresponding to each unicast connection identifier, that is, when the UE 1 indicates a communication carrier to the base station, the UE 1 may distinguish between different unicast connections for indication.

Therefore, according to the sidelink carrier management method provided in this application, a transmitting end communication apparatus determines at least one SL carrier for a unicast connection, and indicates the at least one SL carrier to a receiving end communication apparatus, to implement instant and effective management of the SL carrier, and this improves SL carrier communication efficiency and a system capacity.

FIG. 5 is a schematic framework diagram of an application scenario in which UE 3 is in a non-connected state, for example, the UE 3 is in an idle state or an inactive state according to at least one embodiment of this application. As shown in FIG. 5, the UE 3 is a transmitting end communication apparatus, and UE 4 is a receiving end communication apparatus in a unicast connection to the UE 3. A base station and the UE 3 are in a non-connected state, and the base station cannot directly indicate an SL resource to the UE 3.

It should be understood that FIG. 5 is described only by using an example in which the UE 3 is the transmitting end communication apparatus and the UE 4 is the receiving end communication apparatus. However, at least one embodiment of this application is not limited thereto. For example, the UE 4 may alternatively be a transmitting end communication apparatus, and the UE 3 may alternatively be a receiving end communication apparatus.

Figure 6:
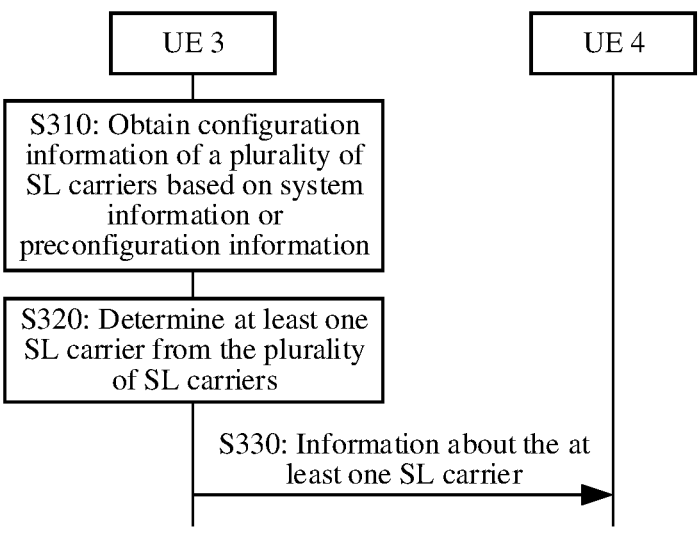
FIG. 6 is a schematic diagram of interaction in another example of a sidelink carrier management method according to at least one embodiment of this application.

It should be further understood that, the transmitting end communication apparatus UE 3 may have only one unicast connection, or may have a plurality of unicast connections. This is not limited in at least one embodiment of this application. FIG. 6 is a schematic diagram of interaction of a sidelink carrier management method 300 according to this application. The method 300 may be applied to the application scenario shown in FIG. 5 or FIG. 3. Unicast communication between UE 4 and UE 5 is used as an example. The method 300 includes the following steps.

S310: UE 3 obtains configuration information of a plurality of SL carriers based on system information or preconfiguration information.

For example, the UE 3 obtains the configuration information of the plurality of SL carriers by listening to a system broadcast of a base station, or the UE 3 obtains the configuration information of the plurality of SL carriers based on the preconfiguration information.

It should be understood that UE in a connected state may also obtain an SL resource by using the foregoing method. For example, in the application scenario shown in FIG. 3, the UE 1 may obtain the configuration information of the plurality of SL carriers by using the base station, or may obtain the configuration information of the plurality of SL carriers by listening to a system broadcast, or may obtain the configuration information of the plurality of SL carriers based on preconfiguration information. This is not limited in this application.

S320: The UE 3 determines at least one SL carrier from the plurality of SL carriers.

For example, the UE 3 determines, from the plurality of SL carriers, one SL carrier as a primary component carrier PCC.

Optionally, the UE 3 autonomously determines the PCC according to a first preset rule.

For example, the UE 3 determines, from the plurality of SL carriers, one SL carrier that meets the first preset rule as the PCC. For example, the first preset rule may include: a reference signal received power RSRP is greater than a first threshold; and/or a channel busy ratio CBR is less than a second threshold. It should be understood that when there are a plurality of SL carriers that meet the first preset rule, an SL carrier with a best link status may be selected as the PCC. At least one embodiment of this application is not limited thereto.

Optionally, the UE 3 may further determine at least one SL carrier from the plurality of SL carriers as a secondary component carrier SCC, that is, the at least one SL carrier determined by the UE 4 from the plurality of SL carriers includes one PCC and at least one SCC. When determining the at least one SCC, the UE 4 may schedule, in a cross-carrier manner, a resource that is for data transmission and that is on the SCC by using control information on the PCC, that is, the PCC may carry control information used to schedule the resource that is for data transmission and that is on the SCC. The control information may be, for example, sidelink control information SCI.

It should be understood that, when the UE 3 has a plurality of unicast connections, the UE 4 may determine at least one SL carrier for each unicast connection. The SL carrier determined by the UE 3 for each unicast connection may be the same or may be different. For example, different preset rules may be determined for each unicast connection based on quality of service (QoS) of each unicast connection, and the UE 3 correspondingly determines the at least one SL carrier for each unicast connection according to the different preset rules. For another example, the at least one SL carrier may be determined for each unicast connection by using a same preset rule. The preset rule is specifically that, for example, RSRP is greater than or equal to a threshold. Then, a different threshold is determined for each unicast connection based on the QoS of each unicast connection, and the UE 3 correspondingly determines the at least one SL carrier for each unicast connection according to the preset rule and based on the different threshold. It should be further understood that a communication apparatus in the connected state may alternatively autonomously determine the at least one SL carrier. For example, in the application scenario shown in FIG. 3, the UE 1 may alternatively autonomously determine the at least one SL carrier from the plurality of SL carriers according to a preset rule. This is not limited in this application.

S330: The UE 3 sends information about the at least one SL carrier to the UE 4.

It should be understood that, in the method 300, a specific procedure of updating an SL carrier in the method 200 is also applicable. For example, after the UE 3 sends the information about the at least one SL carrier to the UE 4, the UE 3 obtains link measurement information of the at least one SL carrier, and the UE 3 updates an SL carrier whose link measurement information meets a second preset rule. For brevity, details are not described in this application again.

It should be noted that the sidelink carrier management method in embodiments of this application is further applicable to a multicast communication scenario. Multicast communication refers to communication between UE in a communication group, and any UE in the group can receive and send multicast service data. When the sidelink carrier management method in embodiments of this application is implemented in a multicast communication scenario, after determining at least one SL carrier for the multicast communication, transmitting end UE needs to send information about the at least one SL carrier to each other UE in the group. It should be understood that, the transmitting end UE may sequentially send the information about the at least one SL carrier to each other UE in the group in a unicast connection manner, or the transmitting end UE simultaneously sends the information about the at least one SL carrier to other UE in the group in a multicast manner.

When a transmitting end communication apparatus performs unicast communication with a peer end communication apparatus by using an SL carrier, a receiving end communication apparatus may perform hybrid automatic repeat request (HARQ) feedback after receiving data sent by the transmitting end communication apparatus. For example, when the receiving end communication apparatus successfully receives the data, the receiving end communication apparatus returns an acknowledgment ACK signal: or when the receiving end communication apparatus fails to receive the data, the receiving end communication apparatus returns a negative acknowledgment NACK signal.

However, when the transmitting end communication apparatus communicates with the receiving end communication apparatus by using a plurality of SL carriers, that is, when the transmitting end communication apparatus communicates with the receiving end communication apparatus by using one PCC and at least one SCC, the receiving end communication apparatus cannot determine a location of a resource of HARQ feedback information for data transmission on a sending SCC. Similarly, the transmitting end communication apparatus cannot determine a location of a resource of HARQ feedback information for data transmission on a receiving SCC. Therefore, how the transmitting end communication apparatus and the receiving end communication apparatus determine a location of a resource of HARQ feedback information for data transmission on an SCC is a problem that needs to be resolved.

Figure 7:
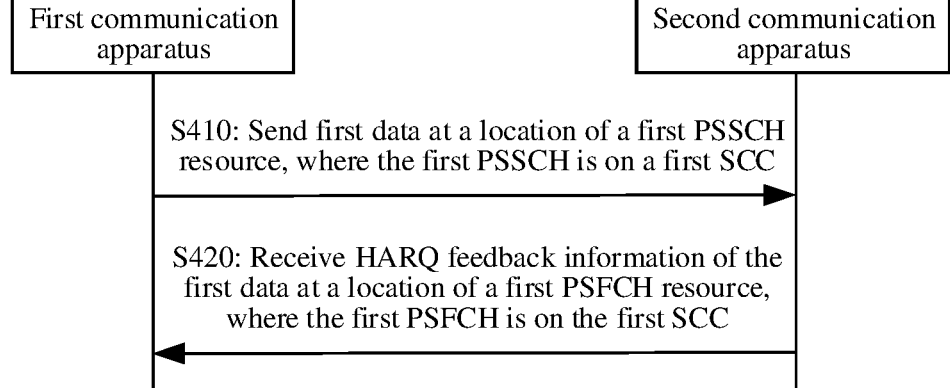
FIG. 7 is a schematic diagram of interaction in an example of a method for determining a HARQ feedback resource according to at least one embodiment of this application.

FIG. 7 is a schematic diagram of interaction in a method 400 for determining a HARQ feedback resource location according to at least one embodiment of this application. As described in FIG. 7, the method 400 includes the following steps.

S410: A first communication apparatus sends first information to a second communication apparatus on a first physical sidelink shared channel (PSSCH) resource, where a location of the first PSSCH resource is on a first SCC, and the first SCC is any SCC in a plurality of carriers.

S420: The first communication apparatus receives, at a location of a first physical sidelink feedback channel (PSFCH) resource, HARQ feedback information that is of the first information and that is sent by the second communication apparatus, where the location of the first PSFCH resource is determined based on the location of the first PSSCH resource, the location of the first PSFCH resource is on the first SCC, and the PSFCH and the PSSCH are in a same resource pool.

For example, when the first communication apparatus and the second communication apparatus communicate with each other by using a plurality of SL carriers, the first communication apparatus and the second communication apparatus determine, on each SL carrier, a location of a resource for HARQ feedback information for data transmission on the SL carrier, namely, a location of a PSFCH resource. For a method for determining, by the first communication apparatus and the second communication apparatus, a resource location of HARQ feedback information for data transmission on an SCC, for example, the first communication apparatus sends the first information to the second communication apparatus at the location of the first PSSCH resource, where the first information includes second-level SCI and transmission data, and the first PSSCH is on the first SCC. Then, the first communication apparatus and the second communication apparatus determine the location of the first PSFCH resource on the first SCC based on the location of the first PSSCH resource. Then, the second communication apparatus sends the HARQ feedback information of the first information to the first communication apparatus at the location of the first PSFCH resource. In other words, HARQ feedback information corresponding to data transmitted on each SCC is transmitted on the SCC.

Figure 8:
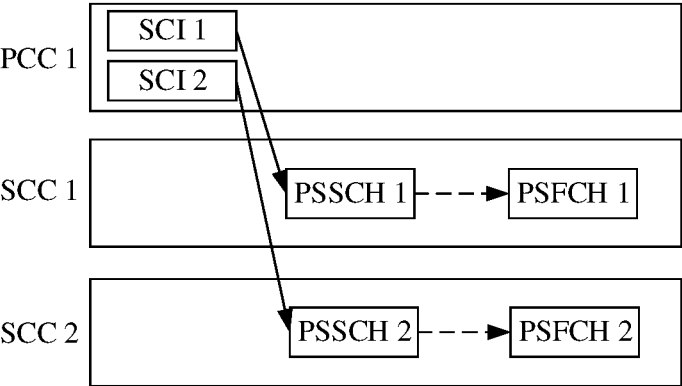
FIG. 8 is a schematic framework diagram of an example according to at least one embodiment of this application.

FIG. 8 is a schematic diagram of a method for determining a HARQ feedback resource according to an application method 400. In FIG. 8, for example, a first communication apparatus communicates with a second communication apparatus by using three SL carriers including a PCC, an SCC 1, and an SCC 2. The first communication apparatus schedules, on the PCC by using SCI 1 in a cross-carrier manner, a resource PSSCH 1 for transmitting data on the SCC 1, and schedules, on the PCC by using SCI 2 in a cross-carrier manner, a resource PSSCH 2 for transmitting data on the SCC 2.

The second communication apparatus determines a location of a PSFCH 1 resource on the SCC 1 based on a location of the PSSCH 1 resource. Then, the second communication apparatus sends, to the first communication apparatus on the PSFCH 1, HARQ feedback information for data transmitted on the PSSCH 1.

Similarly, the first communication apparatus determines the location of the PSFCH 1 resource on the SCC 1 based on the location of the PSSCH 1 resource, and receives, on the PSFCH 1, the HARQ feedback information sent by the second communication apparatus.

Figure 9:
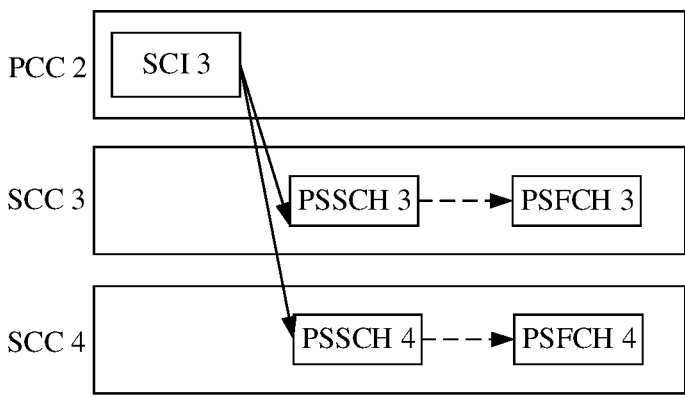
FIG. 9 is a schematic framework diagram of another example according to at least one embodiment of this application.

Optionally, a plurality of PSSCH resources may be indicated by using one piece of SCI. Optionally, the SCI is first-level SCI. For example, FIG. 9 is a schematic diagram of another method for determining a HARQ feedback resource location according to the application method 400. For example, a first communication apparatus communicates with a second communication apparatus by using three SL carriers including a PCC 2, an SCC 3, and an SCC 4. The first communication apparatus schedules, on the PCC 2 by using SCI 3, resources PSSCH 3 and PSSCH 4 for transmitting data on the SCC 3 and the SCC 4 in a cross-carrier manner. The SCI 3 is first-level SCI. In other words, the first communication apparatus may simultaneously schedule SL resources on different carriers by using one piece of first-level SCI.

Therefore, according to the method for determining the HARQ feedback resource in embodiments of this application, locations of HARQ feedback resources for data transmission on different secondary carriers are specified, to avoid a case in which a communication apparatus cannot determine a location of a HARQ feedback resource during multi-carrier communication and affects transmission efficiency.

Figure 10:
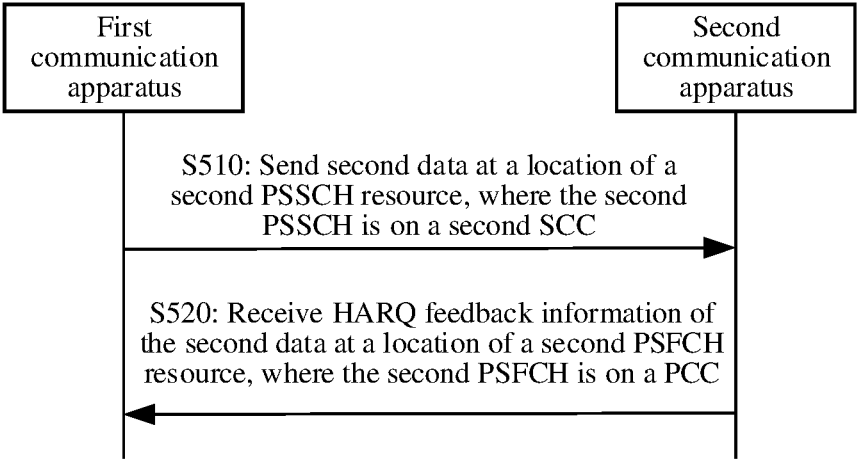
FIG. 10 is a schematic diagram of interaction in another example of a method for determining a HARQ feedback resource according to at least one embodiment of this application.

FIG. 10 is a schematic diagram of interaction in a method 500 for determining a HARQ feedback resource location according to at least one embodiment of this application. As described in FIG. 10, the method 500 includes the following steps.

S510: A first communication apparatus sends second information at a location of a first PSSCH resource, where a second PSSCH is on a second SCC, and the second SCC is any SCC in a plurality of carriers.

S520: The first communication apparatus receives, at a location of the first PSFCH resource, HARQ feedback information that is of the second information and that is sent by a second communication apparatus, where the location of a second PSFCH resource is on a PCC.

Before S520, the first communication apparatus and the second communication apparatus separately determine the location of the second PSFCH resource.

Figure 11:
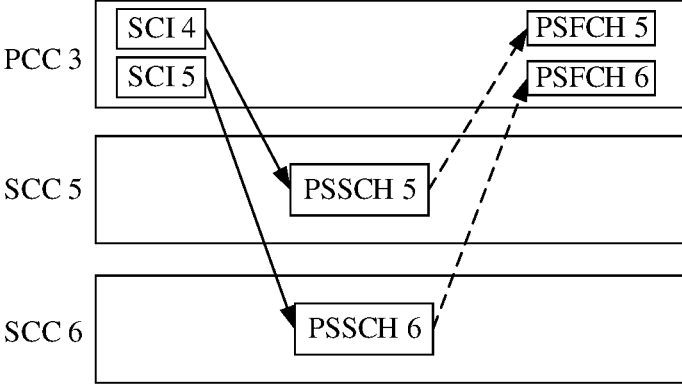
FIG. 11 is a schematic framework diagram of another example according to at least one embodiment of this application.

Optionally, the first communication apparatus and the second communication apparatus determine the location of the second PSFCH resource based on at least one of the location of the second PSSCH resource, an index of the second SCC, and an identifier of a resource pool in which the second PSSCH is located. For example, FIG. 11 is a schematic diagram of a method for determining a HARQ feedback resource location according to the application method 500. For example, a first communication apparatus communicates with a second communication apparatus by using three SL carriers including a PCC 3, an SCC 5, and an SCC 6. The first communication apparatus schedules, on the PCC 3 by using SCI 4 in a cross-carrier manner, a resource PSSCH 5 for transmitting data on the SCC 5, and schedules, on the PCC 3 by using SCI 5 in a cross-carrier manner, a resource PSSCH 6 for transmitting data on the SCC 6.

It should be noted that there may be a plurality of resource pools on one SL carrier. The resource pool needs to be determined before a location of a HARQ feedback resource is determined.

A process in which the first communication apparatus determines a location of a second PSFCH resource is used as an example. The first communication apparatus determines a resource pool of the second PSFCH, where the resource pool in which the second PSFCH resource is located and a physical sidelink control channel (PSCCH) resource are in a same resource pool, and the PSCCH resource carries the SCI 4. Then, the first communication apparatus determines a location of a PSFCH 5 resource based on at least one of a location of the PSSCH 5 resource, an index of the SCC 5 and an identifier of a resource pool in which the PSSCH 5 is located. It should be understood that a location of a PSSCH 3 resource is a relative location of the PSSCH 3 resource in a resource pool corresponding to the PSSCH 3 resource. The index of the SCC 5 is used to indicate a specific SCC, and the identifier of the resource pool in which the PSSCH 5 is located is used to indicate a resource pool in which the PSFCH 5 is located. It should be further understood that the first communication apparatus may determine the location of the PSFCH 5 resource only based on the location of the PSSCH 5 resource and the identifier of the resource pool in which the PSSCH 5 is located. For example, resource pools on different SL carriers are uniformly numbered. In this case, the resource pool in which the PSFCH 5 is located and an SCC on which the PSSCH 5 is located may be uniquely determined based on a resource pool identifier.

It should be understood that, before the method 500, multi-carrier management may be performed by using the sidelink carrier management methods shown in the methods 100 to 300. In this case, when the first communication apparatus sends information about at least one SL carrier determined by the first communication apparatus to the second communication apparatus, an index of an SCC needs to be carried, for example, the index of the SCC 5 in at least one embodiment.

Optionally, the first communication apparatus or the second communication apparatus determines the location of the second PSFCH resource based on a location of the PSCCH resource, where the PSCCH resource carries SCI indicating the location of the second PSSCH resource, and the location of the PSCCH resource is on the PCC. For example, FIG. 12 is a schematic diagram of another method for determining a HARQ feedback resource location according to the application method 500. For example, a first communication apparatus communicates with a second communication apparatus by using three SL carriers including a PCC 4, an SCC 7, and an SCC 8. The first communication apparatus schedules, on the PCC 4 by using SCI 6 in a cross-carrier manner, a resource PSSCH 7 for transmitting data on the SCC 7, and schedules, on the PCC 4 by using SCI 7 in a cross-carrier manner, a resource PSSCH 8 for transmitting data on the SCC 8.

A process in which the first communication apparatus determines a location of a second PSFCH resource is used as an example. The first communication apparatus determines a location of a PSFCH 7 resource based on a location of a PSCCH 7 resource in which the SCI 6 is located, and determines a location of a PSFCH 8 resource based on a location of a PSCCH 8 resource in which the SCI 7 is located. In this case, the first communication apparatus may determine the HARQ feedback resource location based on only a location of a PSCCH resource on the PCC 4.

Optionally, a plurality of PSSCH resources may be indicated by using one piece of SCI. Optionally, the SCI is first-level SCI. For example, FIG. 13 is a schematic diagram of another method for determining a HARQ feedback resource location according to the application method 500. For example, a first communication apparatus communicates with a second communication apparatus by using three SL carriers including a PCC 5, an SCC 9, and an SCC 10. The first communication apparatus schedules, on the PCC 5 by using SCI 8, resources PSSCH 9 and PSSCH 10 for transmitting data on the SCC 9 and the SCC 10 in a cross-carrier manner. The SCI 8 is first-level SCI. In other words, the first communication apparatus may simultaneously schedule SL resources on different carriers by using one piece of first-level SCI. Optionally, data on the SCC 9 and the SCC 10 may be bundled for feedback. To be specific, the first communication apparatus or the second communication apparatus may determine, based on the SCI 8, a PSFCH 9 for the PSSCH 9 and the PSSCH 10 as a location of a HARQ feedback resource of the PSSCH 9 and the PSSCH 10.

It should be understood that, in a scenario in which data on a plurality of SCCs is bundled for feedback, a feedback rule may be set based on a service requirement or a user requirement. For example, in the scenario shown in FIG. 13, when ACK feedback is performed on data on both the SCC 9 and the SCC 10, the second communication apparatus performs the ACK feedback to the first communication apparatus by using a PSFCH. Alternatively, when ACK feedback needs to be performed on at least one of data on the SCC 9 and the SCC 10, the second communication apparatus performs ACK feedback to the first communication apparatus by using a PSFCH. This is not limited in embodiments of this application.

Therefore, according to the method for determining the HARQ feedback resource in embodiments of this application, locations of HARQ feedback resources for data transmission on different secondary carriers are specified, to avoid a case in which a communication apparatus cannot determine a location of a HARQ feedback resource during multi-carrier communication and affects transmission efficiency.

It should be noted that, the method for determining the HARQ feedback resource according to the method 400 or the method 500 provided in embodiments of this application may be independently implemented in a corresponding application scenario, or may be applied to an application scenario of the method 100, the method 200, or the method 300 in embodiments of this application. To be specific, in specific implementations of the method 100 to the method 300, when two communication apparatuses communicate by using a plurality of carriers, a method provided according to the method 400 or the method 500 may be used to determine a HARQ feedback resource.

When two communication apparatuses perform unicast communication by using a plurality of SL carriers, and a quantity of transmitting chains Tx chains or receiving chains Rx chains of the communication apparatuses is insufficient to simultaneously support a plurality of frequency bands, a problem of limited capabilities of the communication apparatuses exists. Therefore, how to simultaneously support a combination of a plurality of frequency bands by using one transmitting chain or receiving chain is an urgent problem to be resolved.

FIG. 14 is a schematic block diagram of a communication method 600 according to at least one embodiment of this application. In the method 600, a first communication apparatus is a transmitting end communication apparatus, and a second communication apparatus is a receiving end communication apparatus. For example, the method 600 may be performed by a base station or the first communication apparatus. As shown in FIG. 14, the method 600 includes the following steps.

S610: Obtain a first switch time and a second switch time, where the first switch time and the second switch time are respectively switch times of the first communication apparatus and the second communication apparatus between a first frequency band and a second frequency band.

Optionally, when the base station performs the method 600, obtaining the first switch time and the second switch time includes: receiving first information sent by the first communication apparatus, where the first information includes the first switch time and the second switch time.

Optionally, when the first communication apparatus performs the method 600, obtaining the first switch time and the second switch time includes: determining the first switch time; and receiving second information sent by the second communication apparatus, where the second information includes the second switch time.

S620: Determine that a time interval is not less than a larger value of the first switch time and the second switch time, where the time interval is a time interval between an end time point of a first resource and a start time point of a second resource, the first resource belongs to the first frequency band, the second resource belongs to the second frequency band, and a time sequence of the first resource is before a time sequence of the second resource.

Figure 15:
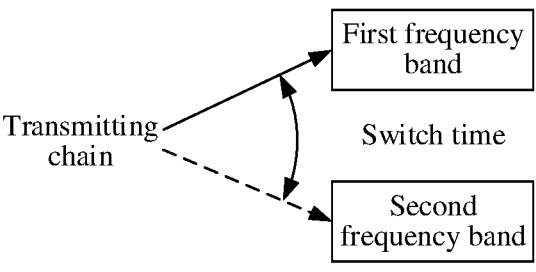
FIG. 15 is a schematic architectural diagram of an example according to at least one embodiment of this application.

In the communication method in embodiments of this application, in a time division manner, one transmitting chain Tx chain of a communication apparatus simultaneously supports two frequency bands in one frequency band pair (band pair). For example, a switch time (switch time) is introduced to support switching of the Tx chain between the two frequency bands in a frequency band pair. FIG. 15 is a schematic diagram of switching of a transmitting chain in a band pair by using a switch time. It can be learned from FIG. 15 that a first frequency band and a second frequency band are two frequency bands in a frequency band pair, and a period of time for the transmitting chain to switch from the first frequency band to the second frequency band is a switch time. When allocating a resource, a base station or a first communication apparatus determines that a time interval between an end time point of a resource in a previous time sequence and a start time point of a resource in a later time sequence is greater than or equal to the switch time.

Before the first communication apparatus performs multi-carrier communication with the second communication apparatus, when the base station schedules or allocates an SL resource to the first communication apparatus, the method 600 may be performed by the base station. For example, the base station first obtains the first switch time of the first communication apparatus and the second switch time of the second communication apparatus, where the first switch time is a switch time of the first communication apparatus between the first frequency band and the second frequency band, and the second switch time is a switch time of the second communication apparatus between the first frequency band and the second frequency band. Specifically, for example, the first communication apparatus reports the first switch time to the base station, receives the second switch time sent by the second communication apparatus, and then reports the second switch time to the base station. That is, the first communication apparatus first reports a switch time capability of the first communication apparatus to the base station, and after obtaining a switch time capability of the second communication apparatus from the second communication apparatus, the first communication apparatus reports the switch time capability of the second communication apparatus to the base station. It should be understood that the base station is a base station connected to the first communication apparatus. A base station connected to the second communication apparatus also uses a similar procedure for reporting a switch time capability. Details are not described in this application. Then, when allocating or scheduling an SL resource to the first communication apparatus, the base station makes the time interval between the first resource and the second resource greater than the larger value of the first switch time and the second switch time, to ensure that no conflict occurs in time domain when the Tx chain simultaneously supports the one frequency band pair in the time division manner.

It should be noted that when the transmitting end communication apparatus obtains an SL resource used for SL data transmission, the transmitting end communication apparatus needs to determine which piece of SL data is to be sent by using the SL resource. When the piece of SL data to be sent belongs to a unicast connection, a switch time capability limitation needs to be additionally considered. For example, after obtaining a first SL resource and a second SL resource, the first communication apparatus performs logical channel prioritization LCP processing to determine SL data that is to be preferentially sent. When the SL data that is to be preferentially sent is data of the unicast connection, it needs to be ensured that a switch time of the first communication apparatus and a switch time of the second communication apparatus are less than a time interval between the first SL resource and the second SL resource, where the second communication apparatus is a peer communication apparatus of the first communication apparatus in the unicast connection.

Before the first communication apparatus performs the multi-carrier communication with the second communication apparatus, when the first communication apparatus obtains an available resource by listening to an SL resource, the method 600 may be performed by the first communication apparatus. For example, the first communication apparatus first obtains the second switch time of the second communication apparatus, and then when determining the first resource and the second resource, the first communication apparatus makes the time interval between the first resource and the second resource greater than the larger value of the first switch time and the second switch time, to ensure that no conflict occurs in time domain when the Tx chain simultaneously supports the one frequency band pair in the time division manner. It should be noted that, when the first communication apparatus obtains a resource based on service data of a specific unicast connection, the first communication apparatus needs to consider a limitation of a switch time capability when obtaining the resource. When the first communication apparatus has a plurality of unicast connections that need to perform data transmission, the first communication apparatus needs to determine a unicast connection for which the obtained SL resource is used for data transmission, and additionally a switch time capability limitation needs to be considered.

Figure 16:
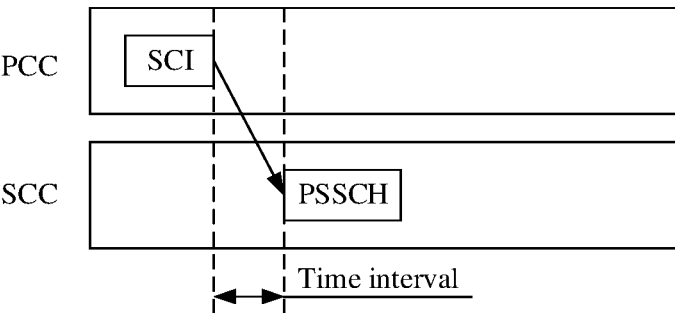
FIG. 16 is a schematic architectural diagram of another example according to at least one embodiment of this application.

FIG. 16 is a schematic diagram of a specific implementation of a communication method to which the method 600 is applied in multi-carrier communication. For example, as shown in FIG. 16, a PCC is a first frequency band, an SCC is a second frequency band, and a Tx chain switches between the first frequency band and the second frequency band in a time division manner. The first communication apparatus indicates a location of a PSSCH resource on the SCC in a cross-carrier manner by using SCI on the PCC, where a time-frequency resource occupied by the SCI is a PSCCH resource, the PSCCH resource is a first resource, the PSSCH resource is a second resource, and an end time point of the PSCCH resource and a start time point of the PSSCH resource are a time interval. When allocating the PSCCH resource and the PSSCH resource, the first communication apparatus or a base station needs to ensure that the time interval is greater than a larger switch time. The larger switch time is a larger value of a switch time of the first communication apparatus to switch between the PCC and the SCC and a switch time of the second communication apparatus to switch between the PCC and the SCC.

It should be understood that both the first resource and the second resource may be PSSCH resources. Alternatively, the first resource is a PSSCH resource, and the second resource is a PSFCH resource. For example, in the schematic diagram of the method for determining the HARQ feedback resource location shown in FIG. 11, to avoid a problem that a capability of a communication apparatus is limited, when allocating the PSSCH 5 resource and the PSFCH 5 resource, the first communication apparatus or a base station needs to ensure that a time interval between the PSSCH 5 resource and the PSFCH 5 resource is greater than a larger switch time.

It should be understood that a switch time of a communication apparatus in a frequency band pair is a hardware capability of the current communication apparatus, and switch times of different communication apparatuses in a same frequency band pair may be the same or may be different.

It should be noted that the switch time described above is a switch time between two frequency bands, and this means that this is a capability for a frequency band pair. However, this does not mean that a corresponding band combination (band combination) has only two bands. For example, the frequency band pair may be a frequency band pair in a frequency band combination, or even the same frequency band pair may have different corresponding switch times in different frequency band combinations. For example, there are two band combinations: Band A+B+C and Band A+B+D. A switch time of band A+B in the combination of Band A+B+C may be different from a switch time of band A+B in the combination of Band A+B+D. Therefore, a switch time is a capability of a frequency band pair (band pair) in a frequency band combination (band combination).

It should be understood that a similar method may be used to enable a receiving chain Rx chain of a communication apparatus to support two frequency bands in a frequency band pair (band pair). For brevity, details are not described in this application.

Therefore, according to the communication method in embodiments of this application, a switch time capability is introduced, so that a transmitting chain or a receiving chain of a communication apparatus can simultaneously support two frequency bands in a frequency band pair, and this improves a communication capability.

It should be noted that the communication method according to the method 600 provided in embodiments of this application may be independently implemented in a corresponding application scenario, or may be applied to an application scenario of the method 100, the method 200, or the method 300 in embodiments of this application. To be specific, in specific implementations of the methods 100 to 300, when two communication apparatuses communicate by using a plurality of carriers, a method according to the method 400 or the method 500 may be used to avoid a capability limitation problem of the communication apparatus.

The methods provided in embodiments of this application are described above in detail with reference to FIG. 2 to FIG. 16. The following describes in detail communication apparatuses provided in embodiments of this application with reference to FIG. 17 to FIG. 23.

Figure 17:
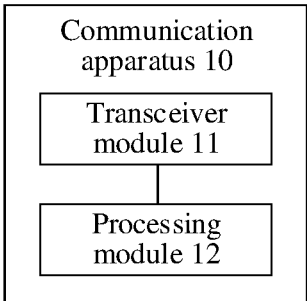
FIG. 17 is a schematic block diagram of an example of a transmitting end communication apparatus according to this application.

FIG. 17 is a schematic block diagram of a communication apparatus according to at least one embodiment of this application. As shown in the figure, a communication apparatus 10 may include a transceiver module 11 and a processing module 12.

In a possible design, the communication apparatus 10 may correspond to the first communication apparatus or the UE 1 in the foregoing method embodiments.

For example, the communication apparatus 10 may correspond to the first communication apparatus (or the UE 1 or the UE 4) in the method 100 to the method 600 according to embodiments of this application. The communication apparatus 10 may include modules configured to perform the method performed by the first communication apparatus (or the UE 1 or the UE 4) in the method 100 in FIG. 2, the method 200 in FIG. 4, the method 300 in FIG. 6, the method 400 in FIG. 7, the method 500 in FIG. 9, or the method 600 in FIG. 14. In addition, units in the communication apparatus 10 and the foregoing other operations and/or functions are respectively used to implement corresponding procedures in the method 100 to the method 600.

When the communication apparatus 10 is configured to perform the method 100 in FIG. 2, the transceiver module 11 may be configured to perform step S130 in the method 100, and the processing module 12 may be configured to perform step S110 and step S120 in the method 100.

When the communication apparatus 10 is configured to perform the method 200 in FIG. 4, the transceiver module 11 may be configured to perform step S210, step S230, and step S240 in the method 200.

When the communication apparatus 10 is configured to perform the method 300 in FIG. 6, the transceiver module 11 may be configured to perform step S330 in the method 300, and the processing module 12 may be configured to perform steps S310 and S320 in the method 300.

When the communication apparatus 10 is configured to perform the method 400 in FIG. 7, the transceiver module 11 may be configured to perform step S410 and step S420 in the method 400.

When the communication apparatus 10 is configured to perform the method 500 in FIG. 9, the transceiver module 11 may be configured to perform step S510 and step S520 in the method 500.

For example, the processing module 12 is configured to obtain configuration information of a plurality of sidelink SL carriers. The processing module is further configured to determine at least one SL carrier from the plurality of SL carriers. The transceiver module 11 is configured to send a first message to a second communication apparatus, where the first message includes information about the at least one SL carrier.

Optionally, the processing module 12 may be specifically configured to determine, from the plurality of SL carriers, one SL carrier as a primary component carrier PCC.

Optionally, the processing module 12 is further configured to determine at least one SL carrier from the plurality of SL carriers as a secondary component carrier SCC, where the PCC carries control information, and the control information is used to schedule a resource that is on the SCC and that is used to transmit data.

Optionally, the transceiver module is specifically configured to receive a second message sent by a base station, where the second message includes the information about the at least one SL carrier; and the processing module is specifically configured to determine the at least one SL carrier based on the second message.

Optionally, the processing module 12 is specifically configured to determine, from the plurality of SL carriers, at least one SL carrier that meets a first preset rule.

Optionally, the first preset rule includes: a reference signal received power switch time is greater than a first threshold; and/or a channel busy ratio CBR is less than a second threshold.

Optionally, the processing module 12 is further configured to: obtain link measurement information of a first SL carrier, where the first SL carrier is any one of the at least one SL carrier; and when the link measurement information of the first SL carrier does not meet a second preset rule, update, by the first communication apparatus, the first SL carrier.

Optionally, the second preset rule includes: reference signal received quality RSRQ is greater than a third threshold; and/or a received signal strength indicator RSSI is greater than a fourth threshold.

Optionally, the processing module 12 is specifically configured to monitor link information of the first SL carrier to obtain first measurement information; and the transceiver module is specifically configured to receive second measurement information from the second communication apparatus, where the second measurement information is link measurement information obtained by the second communication apparatus by monitoring the link information of the first SL carrier.

Optionally, the transceiver module 11 is further configured to send a third message to the base station, where the third message includes the information about the at least one SL carrier.

Optionally, the transceiver module 11 is further configured to send first information to the second communication apparatus at a location of a first physical sidelink shared channel PSSCH resource, where the location of the first PSSCH resource is on a first SCC, and the first SCC is any one of the SCC; and receive hybrid automatic repeat request HARQ feedback information of the first information at a location of a first physical sidelink feedback channel PSFCH resource, where the location of the first PSFCH resource is determined based on the location of the first PSSCH resource, and the location of the first PSFCH resource is on the first SCC.

Optionally, the transceiver module 11 is further configured to: send second information to the second communication apparatus at a location of a second PSSCH resource, where the location of the second PSSCH resource is on a second SCC, and the second SCC is any one of the SCC; and receive HARQ feedback information of the second information at a location of a second PSFCH resource. The processing module is further configured to determine the location of the second PSFCH resource, where the location of the second PSFCH resource is on the PCC.

Optionally, the information about the at least one SL carrier includes an index of the second SCC and an identifier of a resource pool in which the second PSSCH is located.

Optionally, the processing module 12 is specifically configured to determine the location of the second PSFCH resource based on at least one of the location of the second PSSCH resource, the index of the second SCC, and the identifier of the resource pool in which the second PSSCH is located: or determine the location of the second PSFCH resource based on a location of a physical sidelink control channel PSCCH resource, where the PSCCH resource carries SCI indicating the location of the second PSSCH resource, and the location of the PSCCH resource is on the PCC.

Optionally, the PSCCH resource and the second PSFCH resource are in a same resource pool.

Optionally, the processing module 12 is further configured to determine that a period of time for switching between a first frequency band and a second frequency band is a first switch time, where the first frequency band and the second frequency band are frequency bands of the PCC and a third SCC respectively, and the third SCC is any one of the SCC. The transceiver module 11 is further configured to: receive a fourth message sent by the second communication apparatus, where the fourth message includes a second switch time, and the second switch time is a period of time for the second communication apparatus to switch between the first frequency band and the second frequency band. The processing module is further configured to: determine that a time interval is not less than a larger value of the first switch time and the second switch time, where the time interval is a time interval between an end time point of a first resource and a start time point of a second resource, the first resource belongs to the first frequency band, the second resource belongs to the second frequency band, and a time sequence of the first resource is before a time sequence of the second resource.

Optionally, the first resource includes a resource used by a PSCCH, the second resource includes a resource used by a PSSCH, and SCI carried on the PSCCH indicates a location of the resource used by the PSSCH.

Figure 18:
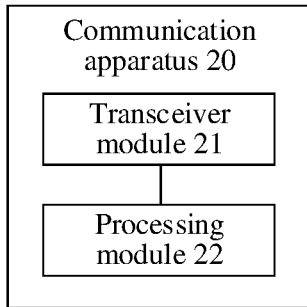
FIG. 18 is a schematic block diagram of an example of a receiving end communication apparatus according to this application.

FIG. 18 is a schematic block diagram of a communication apparatus according to at least one embodiment of this application. As shown in the figure, a communication apparatus 20 may include a transceiver module 21 and a processing module 22.

In a possible design, the communication apparatus 20 may correspond to the second communication apparatus in the foregoing method embodiments.

For example, the communication apparatus 20 may correspond to the second communication apparatus (or the UE 2 or the UE 5) in the method 100 to the method 600 according to embodiments of this application. The communication apparatus 20 may include modules configured to perform the method performed by the second communication apparatus (or the UE 2 or the UE 5) in the method 100 in FIG. 2, the method 200 in FIG. 4, the method 300 in FIG. 6, the method 400 in FIG. 7, the method 500 in FIG. 9, or the method 600 in FIG. 14. In addition, units in the communication apparatus 20 and the foregoing other operations and/or functions are respectively used to implement corresponding procedures in the method 100 to the method 600.

When the communication apparatus 20 is configured to perform the method 100 in FIG. 2, the transceiver module 21 may be configured to perform step S130 in the method 100.

When the communication apparatus 20 is configured to perform the method 200 in FIG. 4, the transceiver module 21 may be configured to perform step S230 in the method 200.

When the communication apparatus 20 is configured to perform the method 300 in FIG. 6, the transceiver module 21 may be configured to perform step S330 in the method 300, and the processing module 22 may be configured to perform step S330 in the method 300.

When the communication apparatus 20 is configured to perform the method 400 in FIG. 7, the transceiver module 21 may be configured to perform step S410 and step S420 in the method 400.

When the communication apparatus 20 is configured to perform the method 500 in FIG. 9, the transceiver module 21 may be configured to perform step S510 and step S520 in the method 500.

For example, the transceiver module 21 is configured to receive a first message sent by a first communication apparatus, where the first message includes configuration information of at least one sidelink SL carrier, and the at least one SL carrier is determined by the first communication apparatus from a plurality of SL carriers.

Optionally, when the first message includes configuration information of one SL carrier, the configuration information of the one SL carrier is configuration information of a primary component carrier PCC.

Optionally, when the first message includes configuration information of at least two SL carriers, the at least two SL carriers include a primary component carrier PCC, an SL carrier other than the PCC in the at least two SL carriers is a secondary component carrier SCC, the PCC carries control information, and the control information is used to schedule a resource that is on the SCC and that is used to transmit data.

Optionally, the processing module 22 is further configured to: monitor link information of a first SL carrier to obtain second measurement information, where the first SL carrier is any one of the at least one SL carrier; and send the second measurement information to the first communication apparatus, where the second measurement information indicates the first communication apparatus to update the first SL carrier that does not meet a second preset rule.

Optionally, the second preset rule includes: reference signal received quality RSRQ is greater than a third threshold; and/or a received signal strength indicator RSSI is greater than a fourth threshold.

Optionally, the transceiver module 21 is further configured to receive, at a location of a first physical sidelink shared channel PSSCH resource, first information sent by the first communication apparatus, where the location of the first PSSCH resource is on a first SCC, and the first SCC is any one of the SCC. The transceiver module is further configured to send hybrid automatic repeat request HARQ feedback information of the first information at a location of a first PSFCH resource, where the location of the first PSFCH resource is determined based on the location of the first PSSCH resource, and the location of the first PSFCH resource is on the first SCC.

Optionally, the transceiver module 21 is further configured to receive, at a location of a second physical sidelink shared channel PSSCH resource, second information sent by the first communication apparatus, where the second PSSCH is on a second SCC, and the second SCC is any one of the SCC. The processing module is further configured to: determine a location of a second PSFCH resource, where the location of the second PSFCH resource is on the PCC. The transceiver module is further configured to: send HARQ feedback information of the second information at the location of the second PSFCH resource.

Optionally, information about the at least one SL carrier includes an index of the second SCC and an identifier of a resource pool in which the second PSSCH is located.

Optionally, the processing module 22 is specifically configured to: determine the location of the PSFCH resource based on at least one of the location of the second PSSCH resource, the index of the second SCC, and the identifier of the resource pool in which the second PSSCH is located: or determine the location of the second PSFCH resource based on a location of a physical sidelink control channel PSCCH resource, where the PSCCH resource carries SCI indicating the location of the second PSSCH resource, and the location of the PSCCH resource is on the PCC.

Optionally, the PSCCH resource and the second PSFCH resource are in a same resource pool.

Optionally, the processing module 22 is further configured to: determine that a period of time for switching between a first frequency band and a second frequency band is a second switch time, where the first frequency band and the second frequency band are frequency bands of the PCC and a third SCC respectively, and the third SCC is any one of the SCC. The transceiver module 21 is further configured to: send a fourth message to the first communication apparatus, where the fourth message includes the second switch time; and perform message transmission with the first communication apparatus on a first resource and a second resource, where the first resource belongs to the first frequency band, the second resource belongs to the second frequency band, a time sequence of the first resource is before a time sequence of the second resource, a time interval between an end time point of the first resource and a start time point of the second resource is not less than a larger value of a first switch time and the second switch time, and the first switch time is a period of time for the first communication apparatus to switch between the first frequency band and the second frequency band.

Optionally, the first resource includes a resource used by a PSSCH, the second resource includes a resource used by a PSSCH, and SCI carried on a PSCCH indicates a location of the resource used by the PSSCH.

Figure 19:
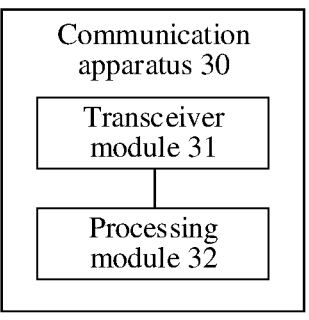
FIG. 19 is a schematic block diagram of an example of a base station according to this application.

FIG. 19 is a schematic block diagram of a communication apparatus according to at least one embodiment of this application. As shown in the figure, a communication apparatus 30 may include a transceiver module 31 and a processing module 32.

In a possible design, the communication apparatus 30 may correspond to the base station in the foregoing method embodiments.

For example, the communication apparatus 30 may correspond to the base station in the method 200 according to embodiments of this application, and the communication apparatus 30 may include modules configured to perform the method performed by the base station in the method 200 in FIG. 4. In addition, units in the communication apparatus 30 and the foregoing other operations and/or functions are respectively used to implement corresponding procedures of the method 200 in FIG. 4.

When the communication apparatus 30 is configured to perform the method 200 in FIG. 4, the transceiver module 31 may be configured to perform step S210 and step S240 in the method 200.

For example, the transceiver module 31 is configured to send a second message to a first communication apparatus, where the second message includes configuration information of at least one sidelink SL carrier, and the second message indicates the first communication apparatus to determine at least one SL carrier for communication with a second communication apparatus.

Optionally, information about the at least one SL carrier includes configuration information of a primary component carrier PCC.

Optionally, the information about the at least one SL carrier further includes configuration information of at least one secondary component carrier SCC, the PCC carries control information, and the control information is used to schedule a resource that is on the SCC and that is used to transmit data.

Optionally, the transceiver module 31 is further configured to receive a third message sent by the first communication apparatus, where the third message includes the information about the at least one SL carrier.

Figure 20:
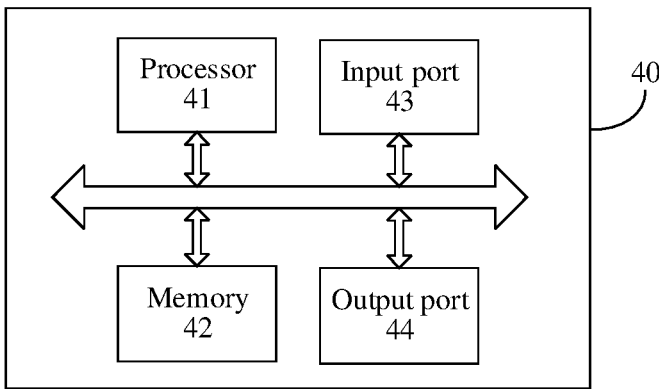
FIG. 20 is a schematic block diagram of an example of a communication apparatus according to this application.

According to the foregoing methods, FIG. 20 is a schematic diagram of a communication apparatus 40 according to at least one embodiment of this application. As shown in FIG. 20, the apparatus 40 may be an apparatus that performs unicast communication by using an SL carrier, or may be various handheld devices, vehicle-mounted devices, vehicle-mounted communication apparatuses, vehicle-mounted communication chips, roadside units, or communication apparatuses in roadside units that have a wireless communication function, a wearable device, a computing device, or another processing device connected to a wireless modem, various forms of terminals, a mobile station (MS), a terminal, user equipment UE, a soft terminal, and the like.

The apparatus 40 may include a processor 41 (where the processor 41 may also be understood as an example of a processing module), and may further include a memory 42. The memory 42 is configured to store instructions, and the processor 41 is configured to execute the instructions stored in the memory 42, so that the apparatus 40 implements the steps performed by a communication apparatus in a corresponding method in FIG. 2, FIG. 4, FIG. 6, FIG. 7, FIG. 9, or FIG. 14.

Further, the apparatus 40 may further include an input port 43 (namely, an example of a transceiver module) and an output port 44 (namely, another example of the transceiver module). Further, the processor 41, the memory 42, the input port 43, and the output port 44 may communicate with each other by using an internal connection path, to transmit a control and/or data signal. A memory 32 is configured to store a computer program. The processor 41 may be configured to invoke the computer program from the memory 42 and run the computer program, to control the input port 43 to receive a signal, and control an output port 54 to send a signal, to complete steps of the terminal device in the foregoing methods. The memory 42 may be integrated into the processor 41, or the memory 42 and the processor 41 may be disposed separately.

Optionally, if the communication apparatus 40 is a communication device, the input port 43 is a receiver, and the output port 44 is a transmitter. The receiver and the transmitter may be a same physical entity or different physical entities. When being the same physical entity, the receiver and the transmitter may be collectively referred to as a transceiver.

Optionally, if the communication apparatus 40 is a chip or a circuit, the input port 43 is an input interface, and the output port 44 is an output interface.

In an implementation, it may be considered that functions of the input port 43 and the output port 44 are implemented through a transceiver circuit or a dedicated transceiver chip. It may be considered that the processor 41 is implemented through a dedicated processing chip, a processing circuit, a processor, or a general-purpose chip.

In another implementation, it may be considered that the communication device provided in at least one embodiment of this application is implemented by using a general-purpose computer. To be specific, program code for implementing functions of the processor 41, the input port 43, and the output port 44 are stored in the memory 42, and a general-purpose processor implements the functions of the processor 41, the input port 43, and the output port 44 by executing the code in the memory 42.

Modules or units in the communication apparatus 40 may be configured to perform actions or processing processes performed by an apparatus for performing SL carrier management in the foregoing methods. To avoid repetition, detailed descriptions are omitted herein.

For concepts, explanations, detailed descriptions, and other steps of the apparatus 40 that are related to the technical solutions provided in embodiments of this application, refer to the descriptions of the content in the foregoing methods or other embodiments. Details are not described herein again.

Figure 21:
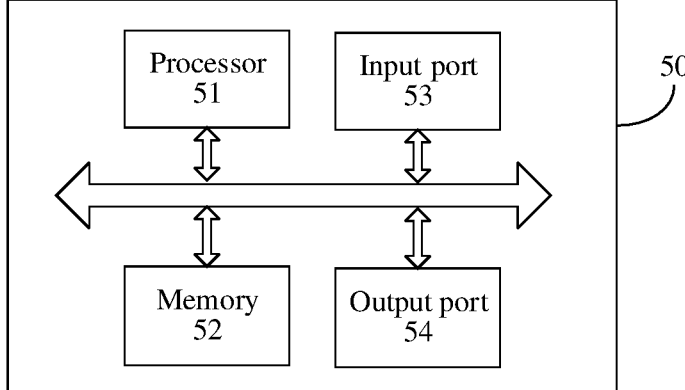
FIG. 21 is a schematic block diagram of another example of a communication apparatus according to this application.

According to the foregoing methods, FIG. 21 is a schematic diagram of a communication apparatus 50 according to at least one embodiment of this application. As shown in FIG. 21, the apparatus 50 may be a network device that performs SL resource allocation or adjustment, and includes a network element having an access management function, such as an AMF.

The apparatus 50 may include a processor 51 (namely, an example of a processing module) and a memory 52. The memory 52 is configured to store instructions, and the processor 51 is configured to execute the instructions stored in the memory 52, so that the apparatus 50 implements the steps for performing SL carrier management in the method corresponding to FIG. 4.

Further, the apparatus 50 may further include an input port 53 (namely, an example of a transceiver module) and an output port 54 (namely, another example of the transceiver module). Further, the processor 51, the memory 52, the input port 53, and the output port 54 may communicate with each other by using an internal connection path, to transmit a control and/or data signal. A memory 62 is configured to store a computer program. The processor 51 may be configured to invoke the computer program from the memory 52 and run the computer program, to control the input port 53 to receive a signal, and control the output port 54 to send a signal, to complete steps of the base station in the foregoing methods. The memory 52 may be integrated into the processor 51, or the memory 52 and the processor 51 may be disposed separately. Optionally, if the communication apparatus 50 is a communication device, the input port 53 is a receiver, and the output port 54 is a transmitter. The receiver and the transmitter may be a same physical entity or different physical entities. When being the same physical entity, the receiver and the transmitter may be collectively referred to as a transceiver.

Optionally, if the communication apparatus 50 is a chip or a circuit, the input port 53 is an input interface, and the output port 54 is an output interface.

In an implementation, it may be considered that functions of the input port 53 and the output port 54 are implemented through a transceiver circuit or a dedicated transceiver chip. It may be considered that the processor 51 is implemented through a dedicated processing chip, a processing circuit, a processor, or a general-purpose chip.

In another implementation, it may be considered that the communication device provided in at least one embodiment of this application is implemented by using a general-purpose computer. To be specific, program code for implementing functions of the processor 51, the input port 53, and the output port 54 are stored in the memory 52, and a general-purpose processor implements the functions of the processor 51, the input port 53, and the output port 54 by executing the code in the memory 52.

Modules or units in the communication apparatus 50 may be configured to perform actions or processing processes performed by a device (namely, the base station) for SL carrier management in the foregoing methods. To avoid repetition, detailed descriptions are omitted herein.

For concepts, explanations, detailed descriptions, and other steps of the apparatus 60 that are related to the technical solutions provided in embodiments of this application, refer to the descriptions of the content in the foregoing methods or other embodiments. Details are not described herein again.

Figure 22:
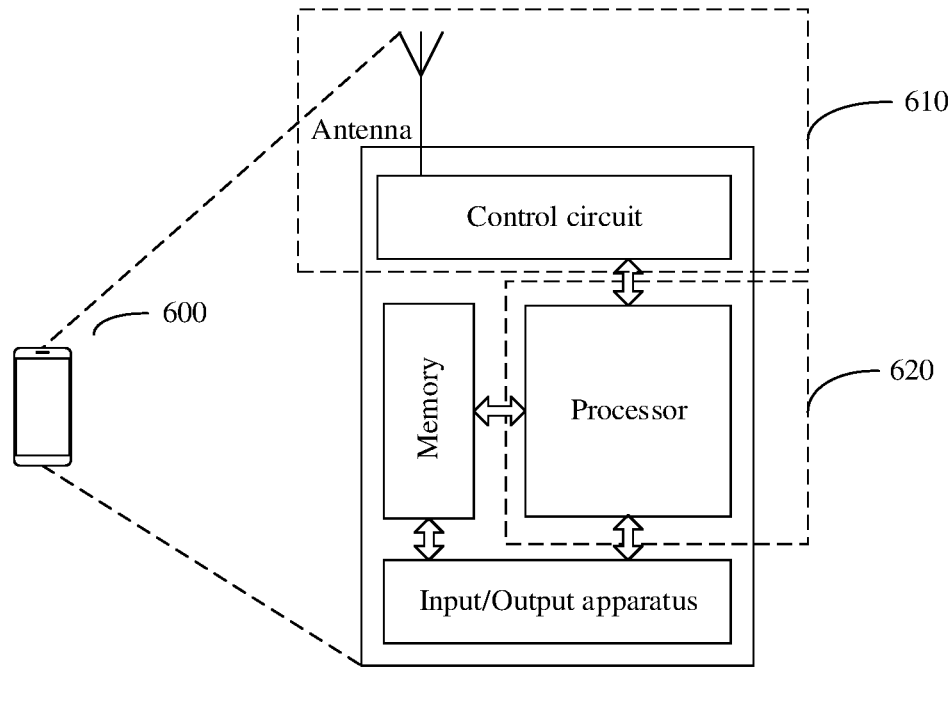
FIG. 22 is a schematic structural diagram of a communication apparatus according to this application.

FIG. 22 is a schematic structural diagram of a communication apparatus 600 provided in this application. For ease of description, FIG. 21 shows only main components of the communication apparatus. As shown in FIG. 22, the communication apparatus 600 includes a processor, a memory, a control circuit, an antenna, and an input/output apparatus.

The processor is mainly configured to process a communication protocol and communication data, control an entire terminal device, execute a software program, and process data of the software program, for example, is configured to support the terminal device to perform the actions described in the foregoing embodiments of the indication method for transmitting a precoding matrix. The memory is mainly configured to store the software program and the data, for example, store a codebook described in the foregoing embodiments. The control circuit is mainly configured to convert a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, or a keyboard, is mainly configured to: receive data input by a user and output data to the user.

After the communication apparatus is powered on, the processor may read a software program in a storage unit, explain and execute instructions of the software program, and process data of the software program. When data needs to be sent in a wireless manner, the processor performs baseband processing on to-be-sent data, and then outputs a baseband signal to a radio frequency circuit. The radio frequency circuit performs radio frequency processing on the baseband signal, and then sends, through the antenna, a radio frequency signal in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 22 shows only one memory and only one processor. In an actual terminal device, there may be a plurality of processors and memories. The memory may also be referred to as a storage medium, a storage device, or the like. This is not limited in embodiments of this application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 21 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, and the terminal device may include a plurality of central processing units to enhance a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

As shown in FIG. 22, the communication apparatus 600 includes a transceiver unit 610 and a processing unit 620. The transceiver unit may also be referred to as a transceiver, a transceiver machine, a transceiver apparatus, or the like. Optionally, a component that is in a transceiver unit 710 and that is configured to implement a receiving function may be considered as a receiving unit, and a component that is in the transceiver unit 710 and that is configured to implement a sending function may be considered as a sending unit. That is, the transceiver unit 610 includes the receiving unit and the sending unit. For example, the receiving unit may also be referred to as a receiver machine, a receiver, a receiving circuit, or the like. The sending unit may be referred to as a transmitter machine, a transmitter, a transmitting circuit, or the like.

The terminal device shown in FIG. 22 may perform actions performed by a communication apparatus in the foregoing method 100 to method 600. To avoid repetition, detailed descriptions thereof are omitted herein.

It should be understood that, the processor in embodiments of this application may be a central processing unit (CPU), or may be another general-purpose processor, a digital signal processor (DSP), an application-specific integrated circuit (ASIC), a field programmable gate array (FPGA), or another programmable logic device, a discrete gate or transistor logic device, a discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example, and not limitation, many forms of random access memories (RAMs) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or a part of the foregoing embodiments may be implemented using software, hardware, firmware, or any combination thereof. When software is used to implement the foregoing embodiments, the foregoing embodiments may be implemented completely or partially in a form of a computer program product. The computer program product includes one or more computer instructions or computer programs. When the computer instructions or the computer programs are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether a function is performed by hardware or software depends on a particular application and a design constraint condition of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments. Details are not described herein again. In the several embodiments provided in this application, it should be understood that the disclosed system, apparatus, and method may be implemented in another manner. For example, the described one or more apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate components may or may not be physically separate, and components displayed as units may or may not be physical units, may be located in one place, or may be distributed on a plurality of network units. A part or all of the units may be selected based on actual requirements to achieve the objectives of the solutions of embodiments. In addition, functional units in embodiments of this application may be integrated into one processing unit, each of the units may exist alone physically, or two or more units are integrated into one unit. When the functions are implemented in a form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A sidelink carrier management method for a unicast communication between a first communication apparatus and a second communication apparatus, comprising:

obtaining, by the first communication apparatus, configuration information of a plurality of sidelink (SL) carriers;

determining, by the first communication apparatus, at least one SL carrier from the plurality of SL carriers; and sending, by the first communication apparatus, a first message to the second communication apparatus, wherein the first message comprises information about the determined at least one SL carrier;

wherein the determined at least one SL carrier comprises a primary component carrier (PCC) and at least one secondary component carrier (SCC) from the plurality of SL carriers, wherein the PCC carries control information, and the control information is used to schedule a resource that is on the at least one SCC and that is used to transmit data.

2. The method according to claim 1, wherein the method further comprises:

sending, by the first communication apparatus, a third message to a base station, wherein the third message comprises the information about the at least one SL carrier.

3. The method according to claim 1, wherein the method further comprises:

sending, by the first communication apparatus, first information to the second communication apparatus at a location of a first physical sidelink shared channel (PSSCH) resource, wherein the location of the first PSSCH resource is on a first SCC, and the first SCC is any one of the at least one SCC; and receiving, by the first communication apparatus, hybrid automatic repeat request (HARQ) feedback information of the first information at a location of a first physical sidelink feedback channel (PSFCH) resource, wherein the location of the first PSFCH resource is determined based on the location of the first PSSCH resource, and the location of the first PSFCH resource is on the first SCC.

4. The method according to claim 1, wherein the method further comprises:

sending, by the first communication apparatus, second information to the second communication apparatus at a location of a second physical sidelink shared channel (PSSCH) resource, wherein the location of the second PSSCH resource is on a second SCC, and the second SCC is any one of the at least one SCC;

determining, by the first communication apparatus, a location of a second physical sidelink feedback channel (PSFCH) resource, wherein the location of the second PSFCH resource is on the PCC; and receiving, by the first communication apparatus, hybrid automatic repeat request (HARQ) feedback information of the second information at the location of the second PSFCH resource.

5. The method according to claim 4, wherein the information about the at least one SL carrier comprises an index of the second SCC and an identifier of a resource pool in which the second PSSCH is located.

6. The method according to claim 5, wherein the determining the location of the second PSFCH resource comprises:

determining, by the first communication apparatus, the location of the second PSFCH resource based on at least one of the location of the second PSSCH resource, the index of the second SCC, or the identifier of the resource pool in which the second PSSCH is located; or determining, by the first communication apparatus, the location of the second PSFCH resource based on a location of a physical sidelink control channel (PSCCH) resource, wherein the PSCCH resource carries sidelink control information (SCI) indicating the location of the second PSSCH resource, and the location of the PSCCH resource is on the PCC.

7. The method according to claim 6, wherein the PSCCH resource and the second PSFCH resource are in a same resource pool.

8. The method according to claim 1, wherein the method further comprises:

determining, by the first communication apparatus, that a period of time for switching between a first frequency band and a second frequency band is a first switch time, wherein the first frequency band and the second frequency band are frequency bands of the PCC and a third SCC, respectively, and the third SCC is any one of the at least one SCC;

receiving, by the first communication apparatus, a fourth message sent by the second communication apparatus, wherein the fourth message comprises a second switch time, and the second switch time is a period of time for the second communication apparatus to switch between the first frequency band and the second frequency band; and determining, by the first communication apparatus, that a time interval is not less than a larger value of the first switch time and the second switch time, wherein the time interval is a time interval between an end time point of a first resource and a start time point of a second resource, the first resource belongs to the first frequency band, the second resource belongs to the second frequency band, and a time sequence of the first resource is before a time sequence of the second resource.

9. A communication apparatus for performing a unicast communication with a second communication apparatus, comprising:

at least one processor, and a memory storing instructions for execution by the at least one processor;

wherein, when executed by the at least one processor, the instructions cause the apparatus to perform operations comprising:

obtaining configuration information of a plurality of sidelink (SL) carriers;

determining at least one SL carrier from the plurality of SL carriers; and sending a first message to the second communication apparatus, wherein the first message comprises information about the determined at least one SL carrier;

the determined at least one SL carrier comprises a primary component carrier (PCC) and at least one secondary component carrier (SCC) from the plurality of SL carriers, wherein the PCC carries control information, and the control information is used to schedule a resource that is on the at least one SCC and that is used to transmit data.

10. The communication apparatus according to claim 9, wherein the operations further comprise:

sending a third message to a base station, wherein the third message comprises the information about the at least one SL carrier.

11. The communication apparatus according to claim 9, wherein, when executed, the instructions cause the apparatus to perform operations comprising:

sending first information to the second communication apparatus at a location of a first physical sidelink shared channel (PSSCH) resource, wherein the location of the first PSSCH resource is on a first SCC, and the first SCC is any one of the at least one SCC; and receiving hybrid automatic repeat request (HARQ) feedback information of the first information at a location of a first physical sidelink feedback channel (PSFCH) resource, wherein the location of the first PSFCH resource is determined based on the location of the first PSSCH resource, and the location of the first PSFCH resource is on the first SCC.

12. The communication apparatus according to claim 9, wherein the operations further comprise:

sending second information to the second communication apparatus at a location of a second physical sidelink shared channel (PSSCH) resource, wherein the location of the second PSSCH resource is on a second SCC, and the second SCC is any one of the at least one SCC;

determining a location of a second physical sidelink feedback channel (PSFCH) resource, wherein the location of the second PSFCH resource is on the PCC; and receiving hybrid automatic repeat request (HARQ) feedback information of the second information at the location of the second PSFCH resource.

13. The communication apparatus according to claim 12, wherein the information about the at least one SL carrier comprises an index of the second SCC and an identifier of a resource pool in which the second PSSCH is located.

14. The communication apparatus according to claim 13, wherein the determining the location of the second PSFCH resource comprises:

determining the location of the second PSFCH resource based on at least one of the location of the second PSSCH resource, the index of the second SCC, or the identifier of the resource pool in which the second PSSCH is located; or determining the location of the second PSFCH resource based on a location of a physical sidelink control channel (PSCCH) resource, wherein the PSCCH resource carries sidelink control information (SCI) indicating the location of the second PSSCH resource, and the location of the PSCCH resource is on the PCC.

15. The communication apparatus according to claim 14, wherein the PSCCH resource and the second PSFCH resource are in a same resource pool.

16. The communication apparatus according to claim 9, wherein the operations further comprise:

determining that a period of time for switching between a first frequency band and a second frequency band is a first switch time, wherein the first frequency band and the second frequency band are frequency bands of the PCC and a third SCC respectively, and the third SCC is any one of the at least one SCC;

receiving a fourth message sent by the second communication apparatus, wherein the fourth message comprises a second switch time, and the second switch time is a period of time for the second communication apparatus to switch between the first frequency band and the second frequency band; and determining that a time interval is not less than a larger value of the first switch time and the second switch time, wherein the time interval is a time interval between an end time point of a first resource and a start time point of a second resource, the first resource belongs to the first frequency band, the second resource belongs to the second frequency band, and a time sequence of the first resource is before a time sequence of the second resource.

* * * * *